US012412244B2

(12) United States Patent
Shi et al.

(10) Patent No.: US 12,412,244 B2
(45) Date of Patent: Sep. 9, 2025

(54) GENERATING SUPER RESOLUTION IMAGES USING DUO-CAMERA ARTIFICIAL REALITY DEVICE

(71) Applicant: Meta Platforms Technologies, LLC, Menlo Park, CA (US)

(72) Inventors: Zheng Shi, Princeton, NJ (US); Grace Elizabeth Kuo, Seattle, WA (US); Yujia Chen, Redmond, WA (US); Daniel Andersen, Redmond, WA (US); Chao Li, Woodinville, WA (US); Richard Andrew Newcombe, Seattle, WA (US); Michael Goesele, Woodinville, WA (US)

(73) Assignee: Meta Platform Technologies, LLC, Menlo Park, CA (US)

( * ) Notice: Subject to any disclaimer, the term of this patent is extended or adjusted under 35 U.S.C. 154(b) by 135 days.

(21) Appl. No.: 18/497,862

(22) Filed: Oct. 30, 2023

(65) Prior Publication Data
US 2024/0144431 A1 May 2, 2024

Related U.S. Application Data

(60) Provisional application No. 63/382,024, filed on Nov. 2, 2022.

(51) Int. Cl.
*G06T 3/4053* (2024.01)
*G02B 27/42* (2006.01)
(Continued)

(52) U.S. Cl.
CPC ........ *G06T 3/4053* (2013.01); *G02B 27/4205* (2013.01); *G06T 5/20* (2013.01);
(Continued)

(58) Field of Classification Search
CPC .......... G06T 3/4053; G06T 5/20; G06T 5/50; G06T 7/11; G06T 2207/20021;
(Continued)

(56) References Cited

U.S. PATENT DOCUMENTS 9,060,142 B2 * 6/2015 Venkataraman ....... H04N 23/69
9,342,873 B1 * 5/2016 Barron .................... G06T 7/223
(Continued)

OTHER PUBLICATIONS

Bhat; et al., "Deep Burst Super-Resolution," Proceedings of the IEEE/CVF Conference on Computer Vision and Pattern Recognition, Jun. 2021, pp. 9209-9218.
(Continued)

*Primary Examiner* — Hung H Lam
(74) *Attorney, Agent, or Firm* — Greenberg Traurig, LLP

(57) ABSTRACT

In particular embodiments, a computing system may capture a first image of a scene using a first camera of an artificial reality device. The system may capture a second image of the scene using a second camera and one or more optical elements of the artificial reality device. The second image may include an overlapping portion of multiple shifted copies of the scene. The system may generate an upsampled first image by applying a particular sampling technique to the first image. The system may generate a tiled image comprising a plurality of repeated second images by applying a tiling process to the second image. The system may generate an initial output image by processing the upsampled first image and the tiled image using a machine learning model. The system may generate a final output image by normalizing the initial output image using the upsampled first image.

20 Claims, 19 Drawing Sheets
(13 of 19 Drawing Sheet(s) Filed in Color)

(51) Int. Cl.
*G06T 5/20* (2006.01)
*G06T 5/50* (2006.01)
*G06T 7/11* (2017.01)
*H04N 23/88* (2023.01)
*H04N 23/90* (2023.01)
*H04N 23/951* (2023.01)

(52) U.S. Cl.
CPC ............... *G06T 5/50* (2013.01); *G06T 7/11* (2017.01); *H04N 23/88* (2023.01); *H04N 23/90* (2023.01); *H04N 23/951* (2023.01); *G06T 2207/20021* (2013.01); *G06T 2207/20081* (2013.01); *G06T 2207/20084* (2013.01); *G06T 2207/20221* (2013.01)

(58) Field of Classification Search
CPC . G06T 2207/20081; G06T 2207/20084; G06T 2207/20221; G06T 3/4046; G02B 27/4205; H04N 23/88; H04N 23/90; H04N 23/951
See application file for complete search history.

(56) References Cited

U.S. PATENT DOCUMENTS

| 9,860,441 | B1* | 1/2018 | Barron | G06T 7/277 |
| 12,039,695 | B1* | 7/2024 | Jiang | G06T 15/005 |
| 2021/0342974 | A1* | 11/2021 | Zhang | G06T 3/4046 |
| 2022/0014723 | A1* | 1/2022 | Pandey | G06T 5/60 |
| 2022/0335637 | A1* | 10/2022 | Price | G06T 7/593 |

OTHER PUBLICATIONS

Dusmanu; et al., "D2-Net: A Trainable CNN for Joint Description and Detection of Local Features," Proceedings of the IEEE/CVF Conference on Computer Vision and Pattern Recognition (CVPR), Jun. 2019, pp. 8092-8101.
Jiang; et al., "Reference-Based Image and Video Super-Resolution via C2-Matching," arXiv:2212.09581v2 [cs.CV], Mar. 19, 2023, Retrieved from the Internet: URL: https://doi.org/10.48550/arXiv.2212.09581, 14 pages.
Jiang; "Robust Reference-Based Super-Resolution via C2-Matching," Proceedings of the IEEE/CVF Conference on Computer Vision and Pattern Recognition, Jun. 2021, pp. 2103-2112.
Kim; et al., "Efficient Reference-Based Video Super-Resolution (ERVSR): Single Reference Image is all You Need," Proceedings of the IEEE/CVF Winter Conference on Applications of Computer Vision (WACV), Jan. 2023, pp. 1828-1837.
Kopf; et al., "Image-Based Rendering in the Gradient Domain," ACM Transactions on Graphics, Nov. 1, 2013, vol. 32, No. 06, 9 pages, Retrieved from the Internet: URL: https://dl.acm.org/doi/abs/10.1145/2508363.2508369.
Simonyan; et al., "Very Deep Convolutional Networks for Large-Scale Image Recognition," International Conference on Learning Representations 2015, Apr. 10, 2015, 14 pages.
Teed; et al., "RAFT: Recurrent All-Pairs Field Transforms for Optical Flow," In Computer Vision—ECCV 2020—16th European Conference, Proceedings, Part II, Aug. 23-28, 2020, 17 pages.
Veluri; et al., "NeuriCam: Video Super-Resolution and Colorization Using Key Frames," arXiv:2207.12496, Jul. 25, 2022, 17 pages.
Zhang; et al., "Image Super-Resolution by Neural Texture Transfer," Proceedings of the IEEE/CVF conference on computer vision and pattern recognition, Jun. 2019, pp. 7982-7991.

\* cited by examiner

704 → Example height map of second optical design setup (with both DOE 202 and refractive lens 204)

702 → Example height map of first optical design setup (with only DOE 202)

GENERATING SUPER RESOLUTION IMAGES USING DUO-CAMERA ARTIFICIAL REALITY DEVICE

PRIORITY

This application claims the benefit, under 35 U.S.C. § 119(e), of U.S. Provisional Patent Application No. 63/382,024, filed 2 Nov. 2022, which is incorporated herein by reference.

TECHNICAL FIELD

This disclosure generally relates to image reconstruction. In particular, the disclosure relates to an optimized optical design setup for a duo-camera artificial reality device and a machine learning based image reconstruction process for generating super resolution images.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

An artificial reality experience, such as augmented reality (AR), may be provided through wearable AR glasses. Generally, the AR glasses have external cameras through which images of the physical or real-world environment may be captured and virtual elements may be overlaid on the captured images to generate AR or mixed reality images to users wearing such AR glasses. The AR glasses have two main requirements for cameras. These requirements include, for example, (1) achieving high-quality image capture and (2) maintaining a small form-factor that is suitable for all day wearable glasses. These two requirements are in general contrary to each other. For example, larger lenses and imaging sensors make capturing high-quality images significantly easier. However, the larger lenses and imaging sensors add to increase in size and weight of the AR glasses. Thus, existing commercial solutions have to make compromises between quality and size.

Single-image super resolution (SISR) methods provide one possibility to achieve both quality and size goals simultaneously by capturing low-resolution images from tiny cameras and then scaling them up using super resolution algorithms. These SISR methods are promising but even state-of-the-art SISR methods cannot achieve quality that is sufficient for semantic tasks, such as, for example, optical character recognition (OCR). This is because high frequency information is permanently lost during the capture process and is not recoverable through an up-scaling process.

As such, an improved reconstruction technique and/or algorithm is needed that can generate high-quality images while maintaining a small form-factor that is suitable for the artificial reality devices, such as AR glasses. Also, an improved optical design for artificial reality devices is needed that can keep these devices lightweight, compact, and/or small while still be able to generate high quality images.

SUMMARY OF PARTICULAR EMBODIMENTS

Particular embodiments described herein relates to a duo-camera artificial reality device (e.g., AR glasses) comprising a guide camera and a single detail camera for generating super resolution images. The guide camera is a low angular resolution camera with a wide field of view (FoV). The detail camera is a high angular resolution camera with a narrower FoV than the guide camera. The duo-camera artificial reality device discussed herein comprises an optimized optical design setup and/or arrangement of optical elements that produces similar results like AR glasses with multiple cameras, such as, for example, one guide camera and 9 detail cameras. In particular embodiments, the optical elements of the duo-camera artificial reality device may include at least a diffractive optical element (DOE) and a sensor. In some embodiments, a refractive lens may also be included that may be used to minimize effects of chromatic aberration. Using the optical elements, multiple shifted copies of a scene are overlayed such that a resulting overlapped detail image is able to capture the scene in high quality from all different views (e.g., 9 detail views). The basic motivation behind this is the fact the image gradients (e.g., edges) in space are typically sparse and that they are preserved when overlaying multiple images.

At a high level, the DOE may be used to achieve the goal of producing similar results like the multi-camera design of the AR glasses with only a single detail camera. For example, the DOE may be designed to function as a beam splitter that splits the incoming light to a single detail camera of the AR glasses into multiple copies. In particular embodiments, the DOE may be positioned such that when light from the single detail camera representing a visual scene hits the DOE, the DOE produces multiple copies of the visual scene. These multiple copies of the scene may be slightly offset and/or shifted with respect to one another such that they represent scene information from different perspectives, similar to having separate detail cameras each providing an image from a different perspective. Each of these multiple copies of the scene represented by light beams may pass through an optional refractive lens, which focuses each light beam to the sensor so that copies of the scene are shifted to different regions of the image sensor, resulting in an overlapped detail image. The overlapped detail image captured by the sensor may correspond to an overlapping portion of the multiple copies of the visual scene, where scene information from the multiple copies in the overlapping portion may be stacked on top of each other. This stacked information included in the overlapped detail image may be discernable at inference time using a machine learning (ML) model or neural network to retrieve high-frequency details (e.g., high quality scene information) from the overlapped detail image and use the retrieved high-frequency details with a wide FoV guide image in order to generate a super resolution wide FoV image of a scene.

In particular embodiments, a reconstruction algorithm and/or technique is used to generate a super resolution output image based on a pair of a guide image and an overlapped detail image. The guide image may be a low-resolution wide FoV image of a scene captured by a guide camera of the duo-camera artificial reality device. The overlapped detail image may be obtained based on a single detail image (e.g., captured using a single detail camera) and using the beam splitting approach discussed above. The overlapped detail image may comprise high-resolution and/or high-frequency scene information based on an overlay of multiple copies (e.g., 9 copies) of the scene overlaid into a single detailed image. In particular embodiments, once the guide image and the overlapped detail image are obtained, the guide image may be upsampled by a certain amount (e.g., 3×) and the overlapped detail image may be tiled or repeated certain times (e.g., 3×3 fashion). The upsampled guide image may not contain high-frequency details/information. Stated differently, high-frequency details may be lost in the upsampled guide image. In particular embodiments, the high-frequency details (or scene information) are provided through the overlapped detail image. For the overlapped detail image to be able to be used for obtaining this high-resolution scene information at various locations for the upsampled guide image, the overlapped detail image first needs to be aligned with the upsampled guide image. This aligning may be done by making the resolution of the overlapped detail image same as the upsampled guide image. The overlapped detail image, however, will not be enlarged in the same way as the original guide image. Instead of upsampling, a tiling or a repeating process is performed on the overlapped detail image. The tiling process basically repeats the same overlapped detail image a certain number of times in both dimensions to generate a tiled image comprising of repeated overlapped detail images. The tiled image has the same resolution as that of the upsampled guide image. One benefit of the tiling process is that the high-frequency and/or high-resolution scene information embedded within the overlapped detail image is copied to be closer to each region/location of the upsampled guide image. This helps a reconstruction network to find high quality scene information from the overlapped detail image at those regions.

The reconstruction algorithm, in particular embodiments, uses a convolutional neural network, such as, for example, u-shaped encoder-decoder network architecture (UNet). At a high level, the UNet takes in a concatenated result of the upsampled guide image and the tiled image comprising of repeated overlapped detail images and generate an initial output image. In particular embodiments, in order to preserve the original color of the scene as captured by the input guide image, the reconstruction algorithm adds a per-channel normalization to the initial output of the UNet. The per-channel normalization uses the guide image's color as guidance, and the reconstruction algorithm accordingly scales the output image's RGB channels. The final result after the per-channel normalization would be a super resolution output image that may be used for a variety of downstream applications. As an example, one of the downstream applications for which the super resolution output image may be used may include photography, such as high-resolution photography, low light photography, high dynamic range photography, and/or general-purpose consumer photography. As another example, downstream applications may include videography and/or low light videography, SLAM/VIO, object tracking, reading and/or processing text and/or bar codes, such as QR codes.

In particular embodiments, a set of training losses may be used to train the ML model (e.g., UNet) discussed herein. For example, the training losses may be computed and then the ML model may be updated based on one or more of these training losses. The ML model may be deemed sufficiently trained when one or more of these training losses are minimized. These training losses, may include, for example, an L1 loss, a visual geometry group (VGG)-based perceptual loss, an edge loss, and a correctness loss. L1 loss is the pixel-wise absolute difference between an output image by the reconstruction algorithm and a target ground truth image. VGG-based perceptual loss helps encourage natural and perceptually pleasing output. In other words, VGG-based perceptual loss ensures that the output image by the reconstruction algorithm looks natural essentially. The edge loss may include applying a high-pass filter to both the output image and the ground truth image to extract high-frequency texture details (e.g., image gradients/edges) associated with both images and then comparing the high-frequency texture details of the output image with the high-frequency texture details of the ground truth image. In particular embodiments, the edge loss is helpful for recovering high-frequency textural details. Correctness loss helps to ensure that there is consistency between the high-resolution output image and the input low-resolution guide image. This is done by first downsampling the output image to the resolution of the original input guide image. Once downsampled, the correctness loss includes calculating the L1 loss (e.g., pixel-wise absolute difference) between the downsampled output image and the original input guide image.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

In particular embodiments, artificial reality devices, such as AR glasses and/or headsets, have at least two main requirements for their cameras. These requirements include, for example, achieving high-quality image captures and maintaining a small form-factor that is suitable for all day wearable glasses. Existing SISR methods provide one possibility to achieve both quality and size goals simultaneously by capturing low-resolution images from tiny cameras and then scaling them up using super resolution algorithms. These SISR methods are promising but even state-of-the-art SISR methods cannot achieve quality that is sufficient for semantic tasks, such as, for example, optical character recognition (OCR). This is because high-frequency information is lost. To overcome this limitation, multiple cameras (e.g., nine detail cameras and one guide camera) may be used with sufficient optical resolution to capture more information. One such example artificial reality device with multiple cameras is discussed in U.S. patent application Ser. No. 18/484,195, filed 10 Oct. 2023, which is hereby incorporated by reference in its entirety. The example artificial reality device with multiple cameras that was originally proposed is discussed in reference to FIG. 1.

Figure 1:
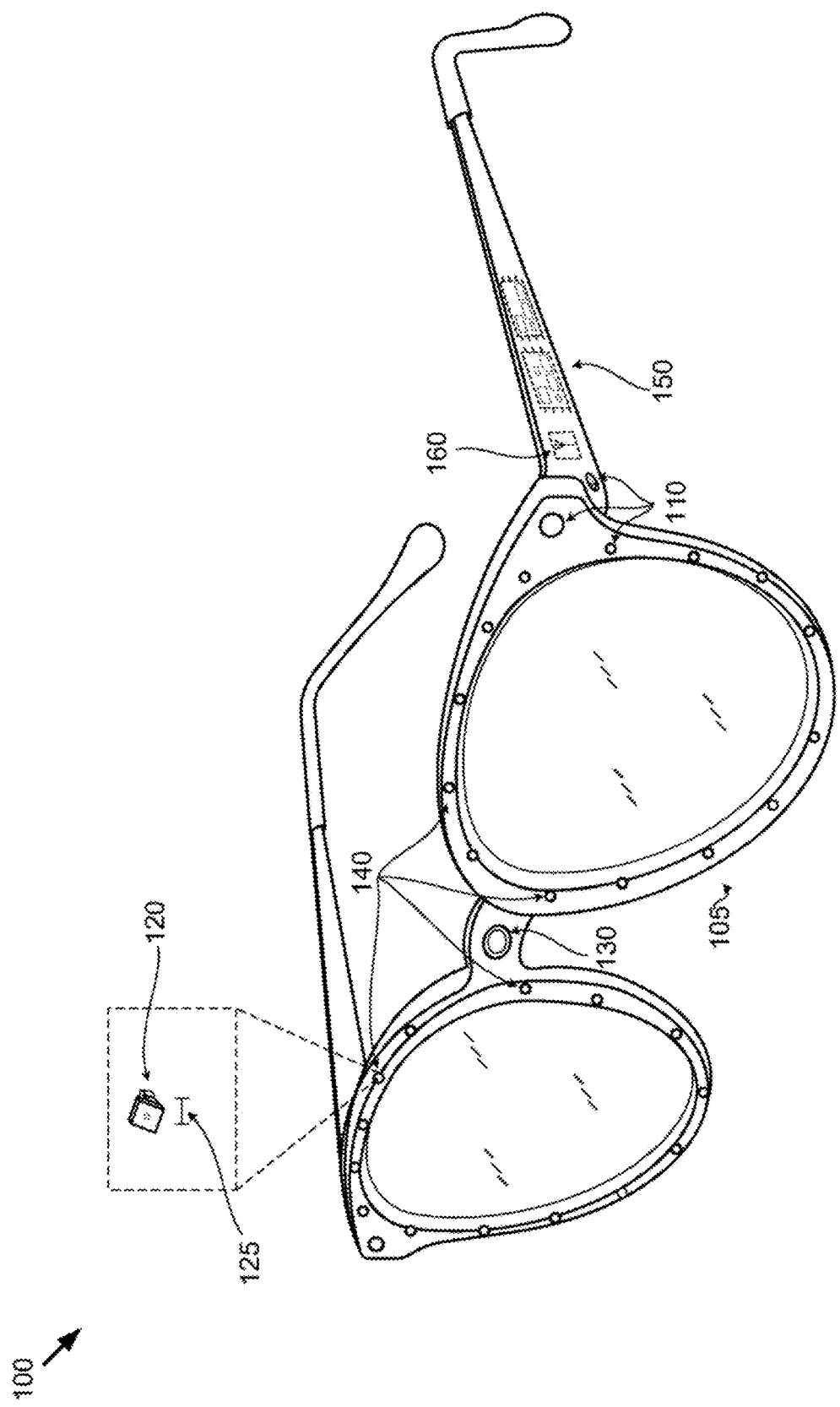
FIG. 1 illustrates an example artificial reality device that may be worn by a user.

FIG. 1 illustrates an example artificial reality device 100 that may be worn by a user. In particular embodiments, the artificial reality device 100 is AR frames or glasses. For ease of reference, the artificial reality device 100 is herein referred to as AR glasses 100. The AR glasses 100 may be worn over the user's eyes and provide content (e.g., mixed reality content) to the user through internal displays (not shown). The AR glasses may have two separate internal displays, one for each eye of the user. As depicted, the AR glasses 100 may comprise a frame 105, and distributed sensors 110 spatially embedded at different structural parts of AR glasses 100, such as integrated within frame 105. By way of an example and not limitation, sensors 110 may include cameras, acoustic sensors, and/or remote sensing modules. Each embedded camera may have a controllable imaging sensor 120, which may be sensitive within and/or outside the visible range of the electromagnetic spectrum. In particular embodiments, an imaging sensor 120 suitable for integration with AR glasses 100 may have a relatively small size, and as such, may be subject to physics-based constraints based on sensor size, diffraction limits, and/or thermal dissipation challenges. In particular embodiments, the imaging sensor 120 may be associated with a characteristic length scale 125. For example, a characteristic length scale 125 may be O(1 mm), i.e., of millimeter scale.

In the embodiment depicted in FIG. 1 and as discussed in the U.S. patent application Ser. No. 18/484,195, the AR glasses 100 includes multiple cameras, including a guide camera 130 and a plurality of detail cameras 140. By way of an example and not limitation, there may be one guide camera and nine detail cameras located on the AR glasses 100. The guide camera 130 and the detail cameras 140 may be configured to capture image(s) of the physical environment around the user and may do so continuously to generate a sequence of frames (e.g., as a video). Each of the guide camera 130 and the detail cameras 140 may capture images from different viewpoints or perspectives. Later on, these images captured from different perspectives may be combined through computation imaging techniques to form a single high-quality image for AR applications. For example, the images captured by one or more of the guide camera 130 or the detail cameras 140 may be used for improved performance for object tracking, visual-inertial odometry (VIO), simultaneous location and mapping (SLAM), as well as general imaging applications and photography.

In particular embodiments, the guide camera 130 may be a low angular resolution camera with a wider field-of-view (FoV). Stated differently, the guide camera 130 may be configured to capture low-resolution wider FoV images of an external physical environment viewed through the AR glasses 100. By way of an example and not limitation, the guide camera 130 may have a FoV of 68°×53° and may include a 1-megapixel sensor, or an 800×600 pixel sensor. A detail camera 140, on the other hand, may be a high angular resolution camera with a relatively narrower FoV than the guide camera 130. Stated differently, the detail camera 140 may be configured to capture high-resolution narrower FoV images of the external physical environment.

In some embodiments, the guide camera 130 may be relatively centrally located on the AR glasses 100. The guide camera 130 may have a larger exposed or visible appearance than a detail camera. By way of example and not limitation, a larger visible appearance of a guide camera may be based on a larger front element requirement for a wider FoV than that of each detail camera 140.

In particular embodiments, AR glasses 100 may be in communication with, and/or may include a computer unit for processing. For example, the AR glasses 100 may include one or more computer systems, such as computer system 1500, and/or parts thereof. In particular embodiments, the AR glasses 100 may include a processing module 150. The processing module 150 may include one or more on-device processor and/or pre-processors. In particular embodiments, parts of processing module 150 may be optimized for performing specialized functions. The processing module 150 may further be optimized for low power consumption and for distributed processing. By way of an example and not limitation, AR glasses 100 may be configured to process one or more particular sensor data streams, and/or performing encoding tasks, on-device via one or more dedicated components of the processing module 150. In some embodiments, the AR glasses 100 may be configured to transmit or otherwise offload particular tasks for off-device processing, such as particular tasks that may be highly computationally intensive, and/or particular tasks or applications that may have a lower sensitivity to latency. In particular embodiments, processing module 150 may be functionally, structurally, and/or operationally compatible with, interoperable with, replaceable by, and/or substantially equivalent to one or more instances of processor 1502 of computer system 1500.

In particular embodiments, the AR glasses 100 may include a communication module 160. The communication module 160 may be configured for communicatively coupling the AR glasses 100 to one or more external devices, networks, and/or systems. For instance, the communication module 160 may include one or more wired connections and/or wireless network interfaces, antennas, modules for connecting to one or more of an off-device module of an AR system of AR glasses 100, local networks (e.g., Wi-Fi, Bluetooth), cellular networks (e.g., 5G or 6G), and/or satellite-based networks (e.g., GPS), among others. In particular embodiments, the communication module 160 may be functionally, structurally, and/or operationally compatible with, interoperable with, replaceable by, and/or substantially equivalent to communication interface 1510 of computer system 1500.

Duo-Camera Artificial Reality Device

While the multi-camera design (e.g., AR glasses with multiple cameras including one low-resolution guide camera and multiple detail cameras), as discussed with respect to FIG. 1, solves the form-factor challenge, it still requires the installation of a larger number of cameras. Combined together, the space needs, extra weight, power consumption, and bandwidth requirements imposed by this multi-camera design may still make the deployment to AR glasses challenging. Additionally, having multiple detail cameras might be cost prohibitive and/or undesirable.

Particular embodiments discussed herein relates to a duo-camera design for artificial reality devices, such as AR glasses 100, that keeps the core idea of distributed sensing intact, but aims to reduce the number of cameras. This is achieved by packing signals from the multiple detail cameras 140 of the multi-camera design into a single detail camera while still producing similar results. Stated differently, the total number of cameras used previously on the AR glasses 100 (e.g., 10 cameras including 1 guide and 9 detail cameras) could be significantly fewer (e.g., 2 cameras including 1 guide and 1 detail camera) while still producing similar results. The duo-camera design for AR devices or more simply, a duo-camera AR system/device with one guide camera 130 and one detail camera 140 is made possible by using a modified optical design and/or assembly (e.g., as shown and discussed in reference to FIG. 2) and a machine learning (ML) based reconstruction process (e.g., discussed in reference to FIG. 9). Using the optical design of FIG. 2, multiple shifted copies of a scene may be overlayed such that a resulting overlapped detail image is able to capture the scene in high quality from all different views (e.g., 9 detail views). The basic motivation behind this is the fact the image gradients (e.g., edges) in space are typically sparse and that they are preserved when overlaying multiple images.

Optical Elements of Duo-Camera Artificial Reality Device

Figure 2:
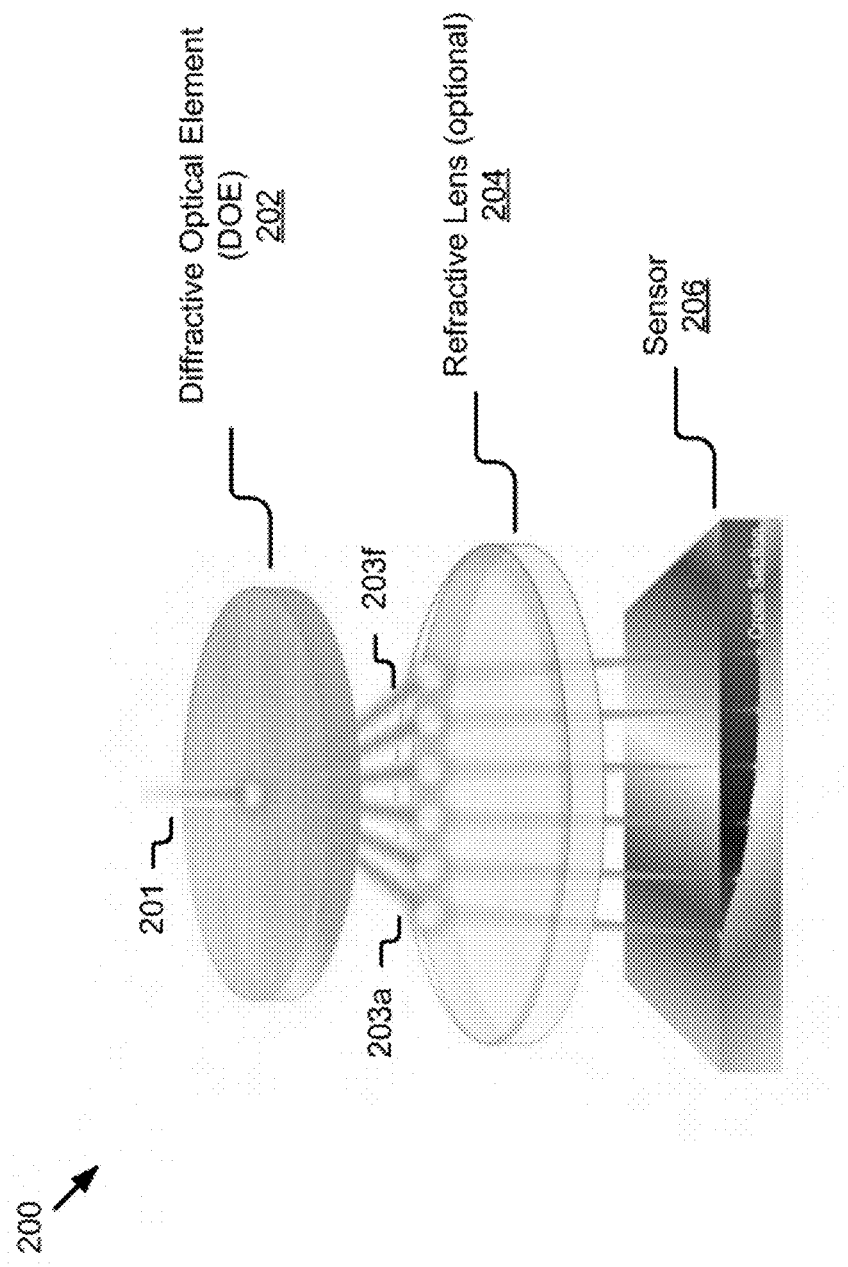
FIG. 2 illustrates an example optical design setup of a duo-camera artificial reality device, in accordance with particular embodiments.

FIG. 2 illustrates an example optical design setup 200 of a duo-camera artificial reality device. In particular embodiments, the duo-camera artificial reality device discussed herein may be AR glasses or headset with two cameras, including one guide camera and one detail camera. The optical design setup 200 shows an example arrangement of some of the optical elements included in the duo-camera artificial reality device. In particular embodiments, the optical design setup 200 may include at least a diffractive optical element (DOE) 202 and a sensor 206. In some embodiments, the optical design setup 200 may also optionally include a refractive lens 204 that may be used to minimize effects of chromatic aberration, as discussed later below in this disclosure.

The DOE 202 may be a type of flat lens with microstructure patterns that modulates transmitted light via diffraction. At a high level, the DOE 202 may be used to achieve the goal of producing similar results like the multi-camera design of the AR glasses 100 with only a single detail camera 140. For example, the DOE 202 may be designed to function as a beam splitter that splits the incoming light 201 from a single detail camera 140 of the AR glasses into multiple copies (e.g., 203a-203f). In particular embodiments, the DOE 202 may be positioned such that when light 201 from the single detail camera 140 representing a visual scene hits the DOE 202, the DOE 202 produces multiple copies of the visual scene. These multiple copies of the scene may be slightly offset and/or shifted with respect to one another such that they represent scene information from different perspectives, similar to having separate detail cameras each providing an image from a different perspective. Each of these multiple copies of the scene represented by light beams 203a-203f may pass through an optional refractive lens 204, which focus each light beam to the sensor 206 so that copies of the scene are shifted to different regions of the image sensor 206, resulting in an overlapped detail image. It should be noted that the overlapped detail image may sometimes be interchangeably referred to as an overlaid detail image, an overlapping detail image, detailed overlaid image, a detail overlay image, an overlapped detailed image, or an overlaid detailed image throughout this disclosure, and they all refer to the same image and mean the same thing. The overlapped detail image captured by the sensor 206 may correspond to a middle overlapping portion of the multiple copies of the visual scene, where scene information from the multiple copies in the overlapping portion may be stacked on top of each other, as shown, for example, in FIGS. 3 and 4D. This stacked information included in the overlapped detail image may be discernable at inference time using a ML model or neural network to retrieve high quality scene information and concatenate the retrieved scene information with a wide FoV guide image in order to generate a super resolution wide FoV image of a scene, as discussed, for example, in reference to at least FIG. 9.

In one embodiment, multiple overlapping scenes (e.g., 9 overlapping scenes) may be captured by the image sensor 206. Although the multiple copies of scene information are mixed into a single overlapped detail image, details of the scene would still be recoverable in most use cases. Typically, gradient information (e.g., edges) within a scene is sparse. So even though multiple copies (e.g., 9 copies) of the scene are overlapping one another, the gradient/edge information would still be discernable. Examples of how an overlapped detail image is created are now discussed below with respect to at least FIGS. 3 and 4A-4D.

Figure 3:
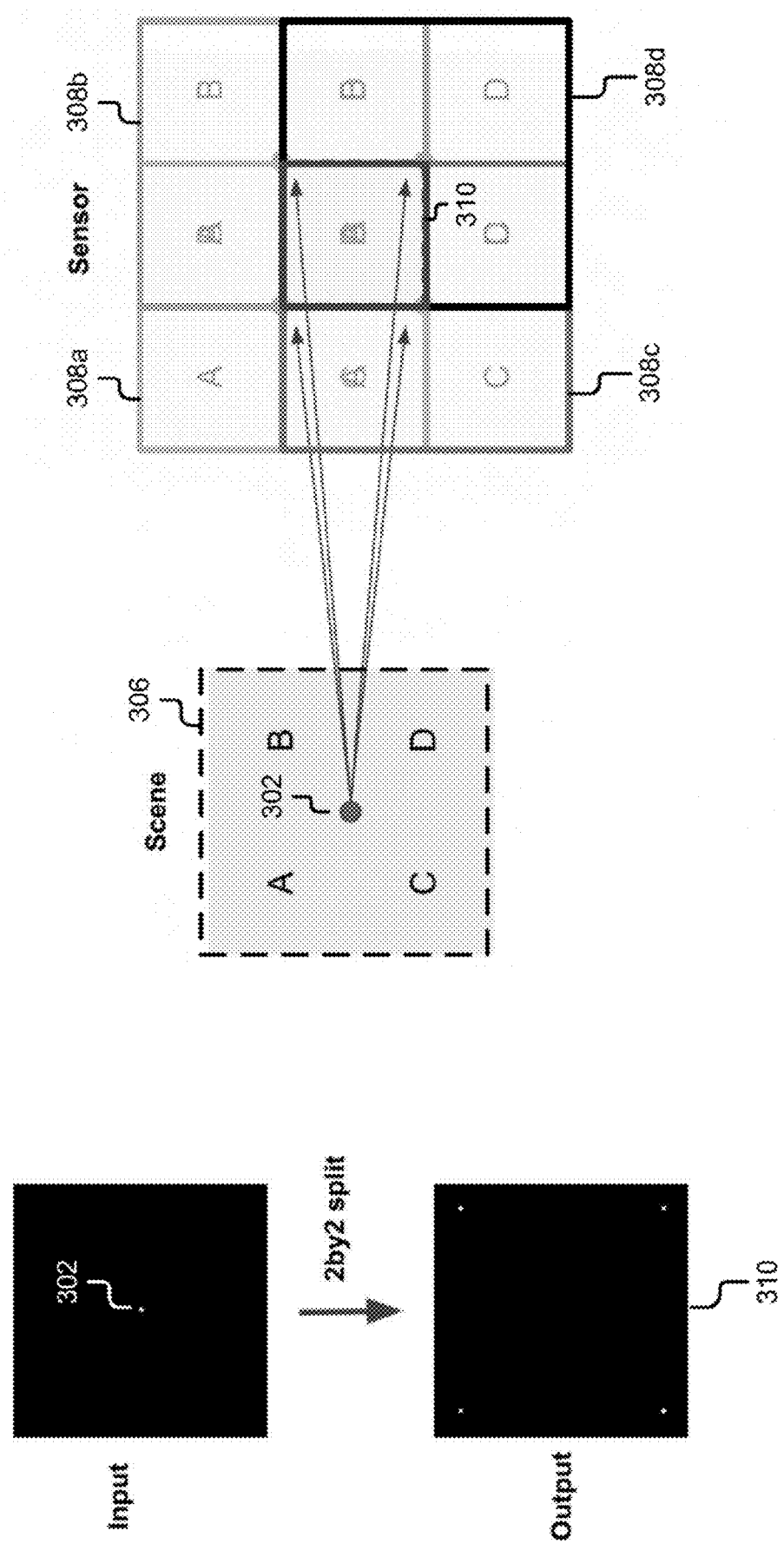
FIG. 3 illustrates an example of creating an overlapped detail image with a diffractive optical element of the duo-camera artificial reality device.

FIG. 3 illustrates an example of creating an overlapped detail image with a DOE of the duo-camera artificial reality device discussed herein. Specifically, FIG. 3 shows an illustrative example of how a 2×2 DOE beam splitter (e.g., DOE 202) may be used to create an overlapped detail image 310 of four shifted copies of a scene 306. Although a 2×2 DOE beam splitter is used in FIG. 3, it should be noted that this is merely for example illustration purposes and the disclosure contemplates using beam splitter of any configuration as per specific needs and/or requirements. For example, a 3×3 DOE beam splitter may be used to split the incoming light into 9 light beams to create an overlapped detail image of 9 shifted copies of a scene stacked on top of each other, as shown and discussed in FIGS. 4A-4D. Assuming the DOE is a perfect beam splitter, it splits a point light 302 into a 2×2 grid 310. The DOE may be designed such that the distance of 2 neighboring points in the grid is equal to the edge of the sensor area, denoted as d. Assume that without the DOE component, the scene of interest will create a square image on the sensor plane with a dimension of 2d×2d. The space may be divided into four quadrants or patches. These four image patches may be denoted as A, B, C, and D, respectively. With the DOE beam splitter (e.g., DOE 202) in place, the final output image 310 will be an overlay of four shifted copies (represented by orange box 308*a*, green box 308*b*, blue box 308*c*, and black box 308*d*) of the original 2d×2d image 306. These four copies 308*a*, 308*b*, 308*c*, 308*d* overlap each other in the central region 310 (e.g., represented by red box) with a d×d size. This region 310 will be an overlay of all four image patches, and this will be where the sensor 206 is located. So even though light was focused only on a particular point 302 of the scene 306, the entire scene information (e.g., comprising A, B, C, and D patches) from different perspectives is comprised into the overlapping region 310 using the beam splitting approach discussed herein.

Figure 4A:
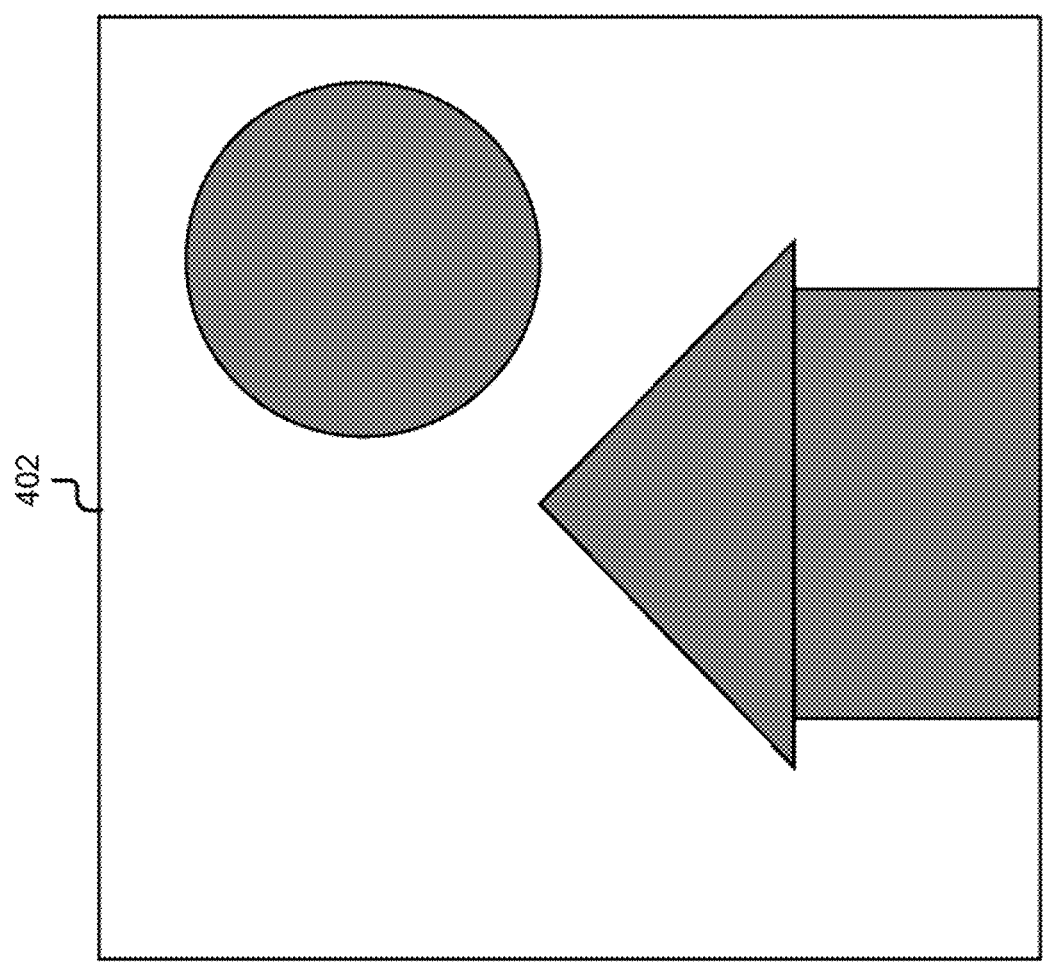
FIGS. 4A-4D illustrate another example of creating an overlapped detail image with a diffractive optical element of the duo-camera artificial reality device.
Figure 4B:
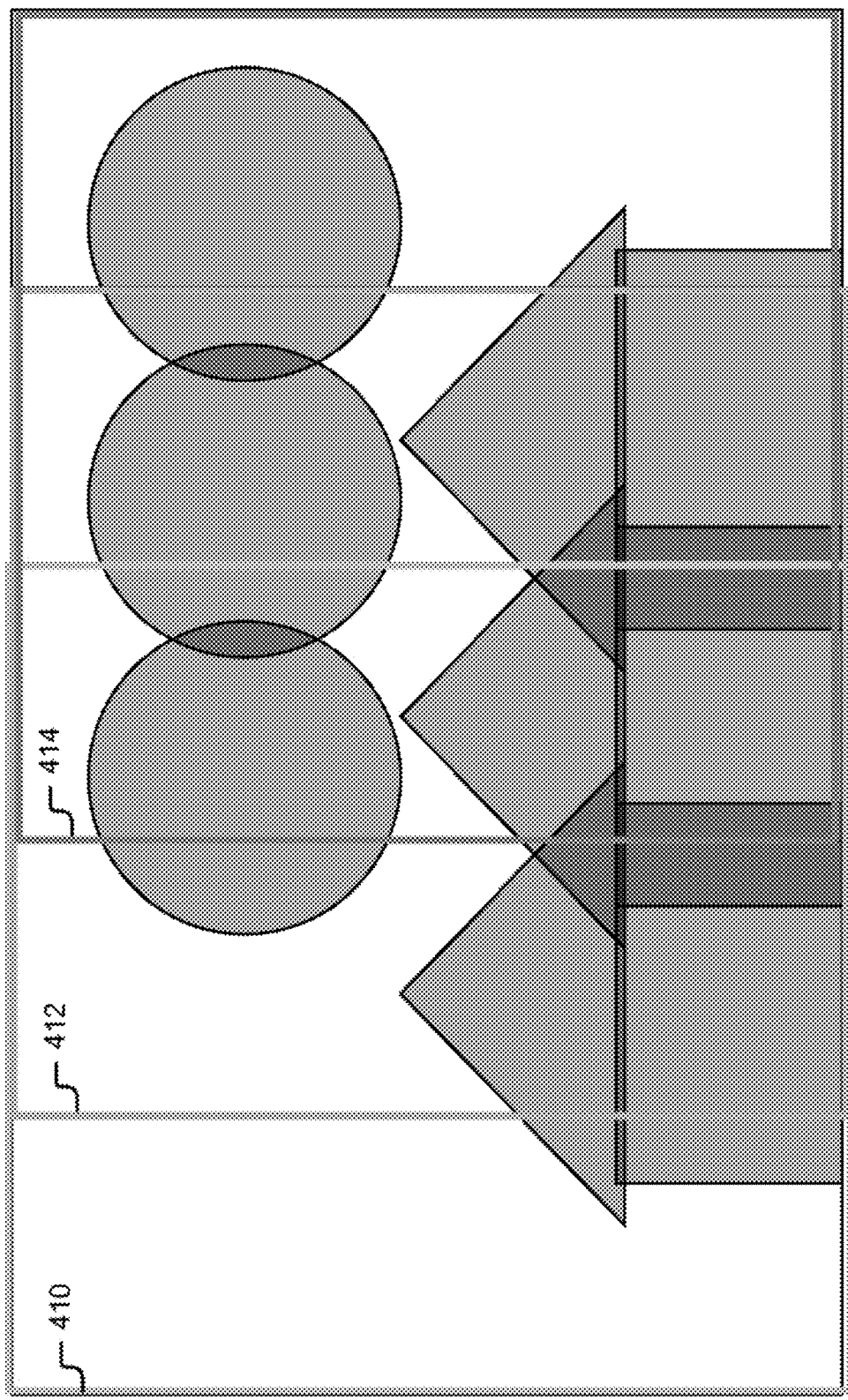
Figure 4C:
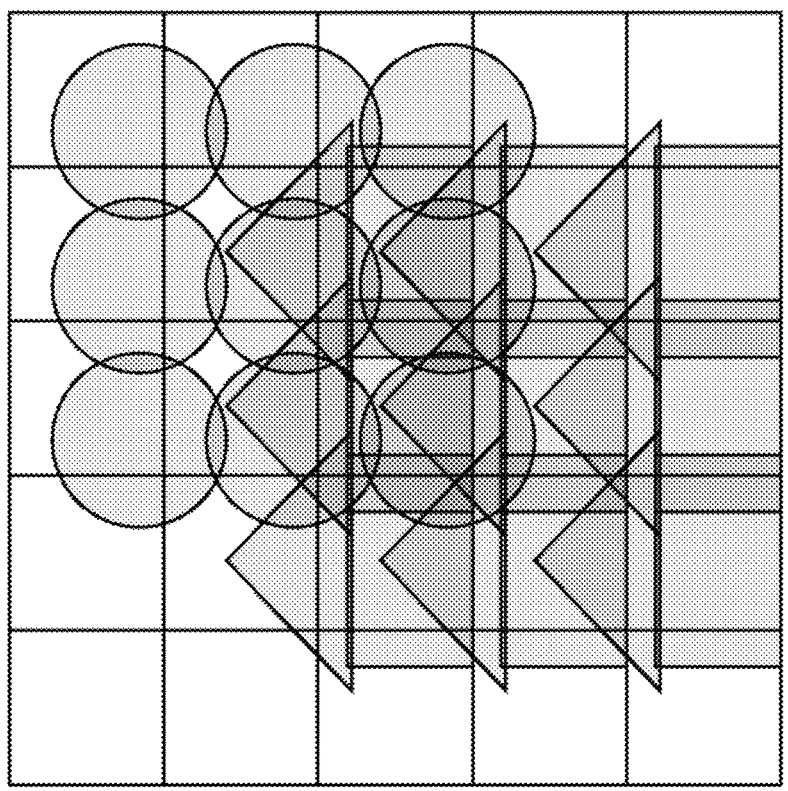
Figure 4D:
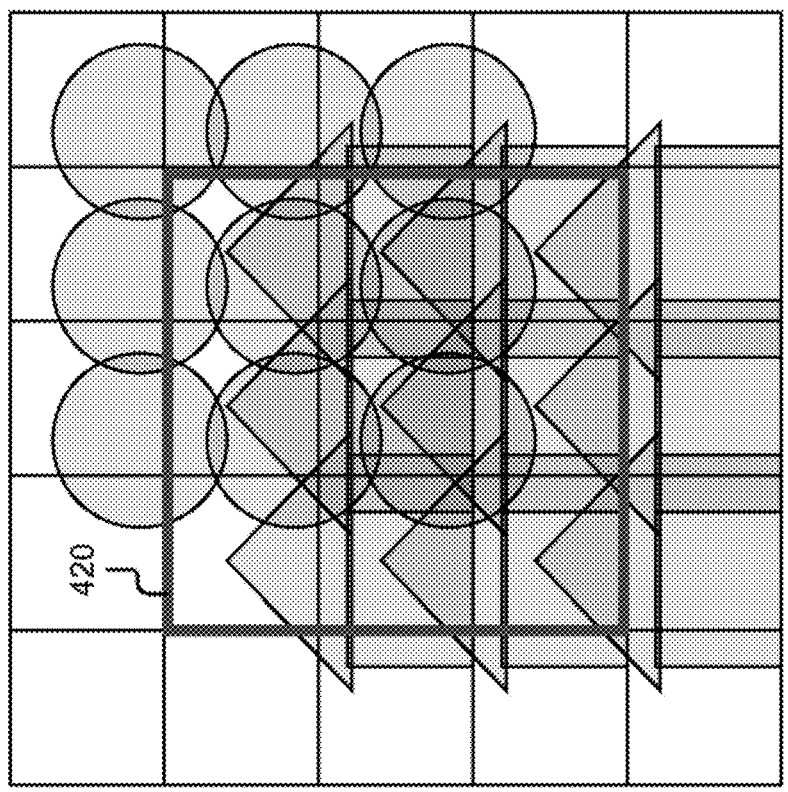

FIG. 4A-4D illustrate another example of creating an overlapped detail image with a DOE of the duo-camera artificial reality device discussed herein. Specifically, FIG. 4A-4D shows an illustrative example of how a 3×3 DOE beam splitter (e.g., DOE 202) may be used to create an overlapped detail image 420 based on nine shifted copies of a scene 402. FIG. 4A depicts a high-resolution image of the scene 402. In particular embodiments, the high-resolution image of the scene 402 may be captured by a single detail camera 140 included in the duo-camera AR device discussed herein. Incoming light from the detail camera 140 representing the scene 402 may be transmitted through a 3×3 DOE beam splitter (e.g., DOE 202), which splits the transmitted light into multiple light beams corresponding to multiple copies of the scene 402. Each copy of the scene may represent scene information. FIG. 4B depicts the scene 402 copied in horizontal dimension upon applying the 3×3 DOE beam splitter. Since a 3×3 beam splitter is used in this example, applying the beam splitting only in one-dimension results in three copies of the scene 402, as indicated by yellow box 410, green box 412, and blue box 414. In particular embodiments, the DOE may be positioned, and the beam splitting may be performed such that the three copies of the scene 402 may be slightly shifted with respect to one another. This results in each copy of the scene 402 capturing the scene 402 from a slightly different perspective or viewpoint than its counterpart. FIG. 4C depicts the scene 402 copied in both dimensions (i.e., vertical as well as horizonal). Since a 3×3 beam splitter is used in this example, applying the beam splitting in both dimensions results in nine shifted copies of the scene 402. FIG. 4D depicts an example overlapped detail image 420 (indicated by red box) captured by the image sensor 206 based on the nine shifted copies of the scene 402. In particular embodiments, the overlapped detail image 420 is generated by taking an overlap/sum of the nine copies. Stated differently, the overlapped detail image 420 may correspond to an overlapping portion of the nine shifted copies, where the scene information represented by the nine copies may be stacked on top of each other in the overlapped detail image 420. This stacked information included in the overlapped detail image 420 may be discernable at inference time using a ML model to retrieve high-frequency image information (e.g., edges) and concatenate the retrieved information with a low-resolution wide FoV guide image in order to generate a super resolution wide FoV image of the scene, as discussed, for example, in reference to at least FIG. 9.

Figure 5A:
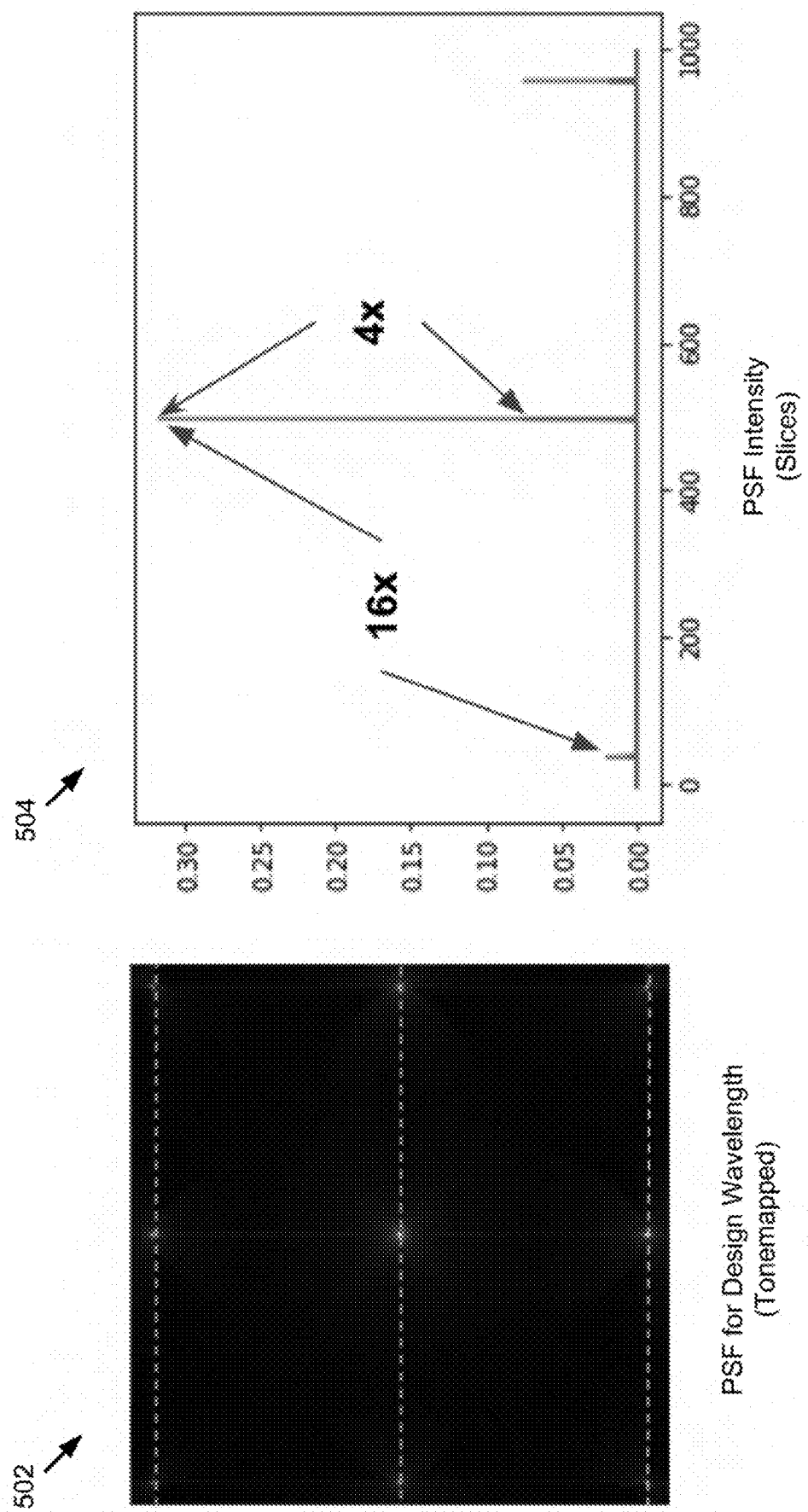
FIG. 5A illustrates an example point spread function (PSF) and PSF intensities for a naïve optical design when an achromatic light source is used.
Figure 5B:
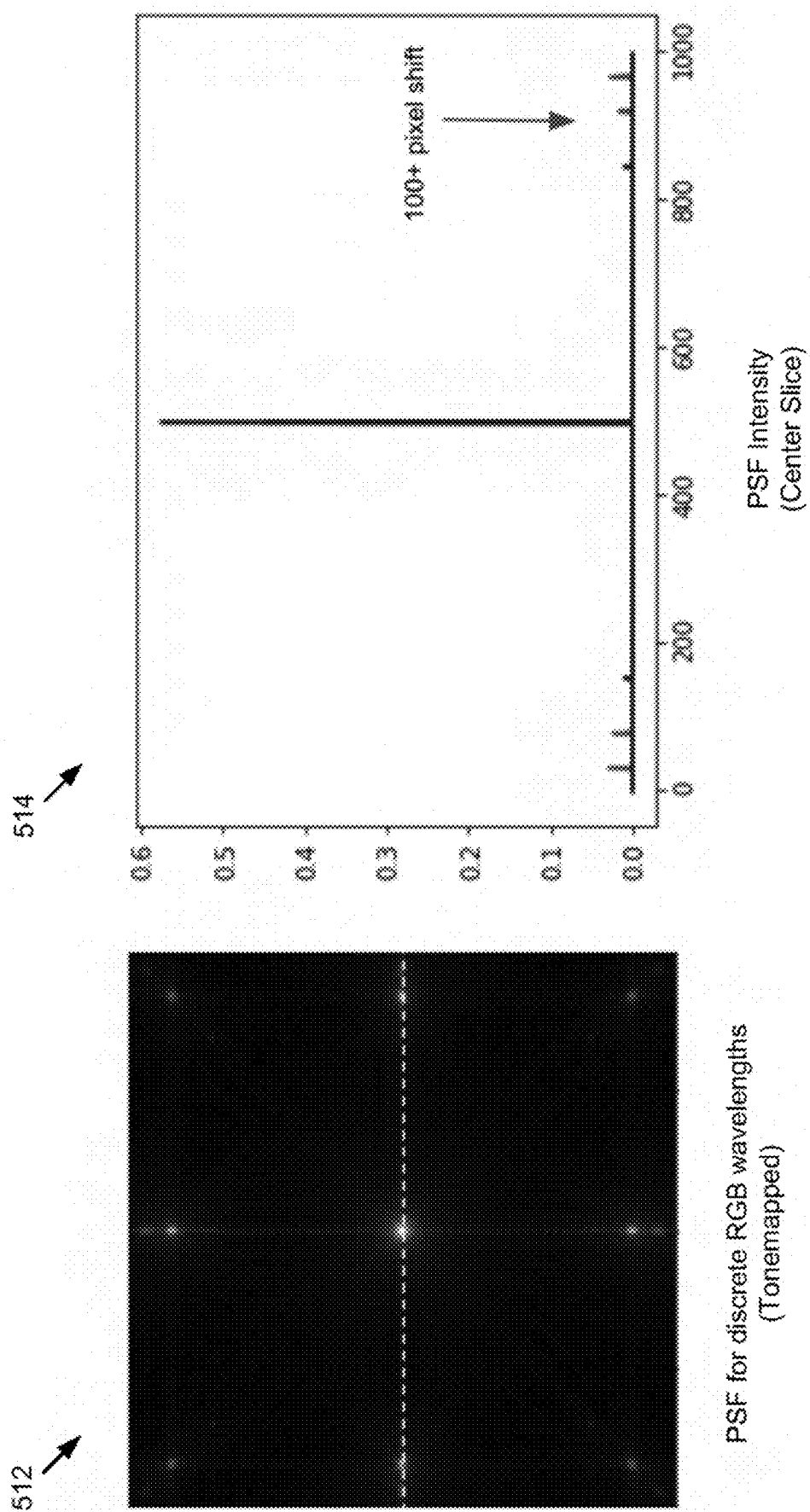
FIG. 5B illustrates an example PSF and PSF intensities for a naïve optical design when a chromatic light source is used.

Returning to FIG. 2, designing the DOE 202 for the duo-camera AR device discussed herein may require specifying the height of optical elements at each location, denoted by H(x), where H is the height and x is the spatial coordinate. Different heights may lead to different phase shifts, and thus the light will be modulated through diffraction. The goal of the DOE design is to find a height map H(x) such that the DOE's point spread function (PSF) results in a particular dimension light grid, such as, for example, 3×3 light grid. While H(x) being a sinusoidal function, it is easy to achieve the first goal, but it suffers from two major challenges. First, among the particular number of response point lights (e.g., 9 response lights), the center point has much higher brightness values than the border points, resulting in uneven brightness. As a result of the unevenness brightness, an overlapped detail image (or overlaid detail image) will be dominated by the center crop. The other detail images are too weak to be recovered. The second challenge when designing the DOE 202 for the duo-camera AR device is that the DOE's PSF will change with different colors. Thus, when a chromatic light source is considered, different colored lights will have different responses, resulting in the spatial offsets of the delta peaks. The first problem of uneven brightness and second problem of DOE's PSF changing with different colors are illustrated, by way of examples, in FIGS. 5A and 5B. For example, FIG. 5A illustrates an example tonemapped PSF 502 for a naïve DOE design with sinusoidal grating and example key slices 504 of the PSF or PSF intensity when an achromatic light source is used. Here, FIG. 5A illustrates the case of achromatic PSF with design wavelength being 550 nm. FIG. 5B illustrates an example tonemapped PSF 512 for discrete RGB wavelengths and example key slices 514 of the PSF or PSF intensity when a chromatic light source is used. Here, FIG. 5B illustrates the case of chromatic PSF for three different colors, red: 656 nm, green: 589 nm, blue: 486 nm.

In particular embodiments, the first problem of uneven brightness (e.g., center point being much brighter than other points) may be addressed by optimizing the height map function H(x) such that the particular number of response peaks (e.g., nine response peaks) are as equal as possible. It has been found that the best way to achieve this is to minimize the following loss function:

Loss=max(⅑-peak_intensity), where peak_intensity=sum (intensity within r<=1 around each peak location)

Figure 6:
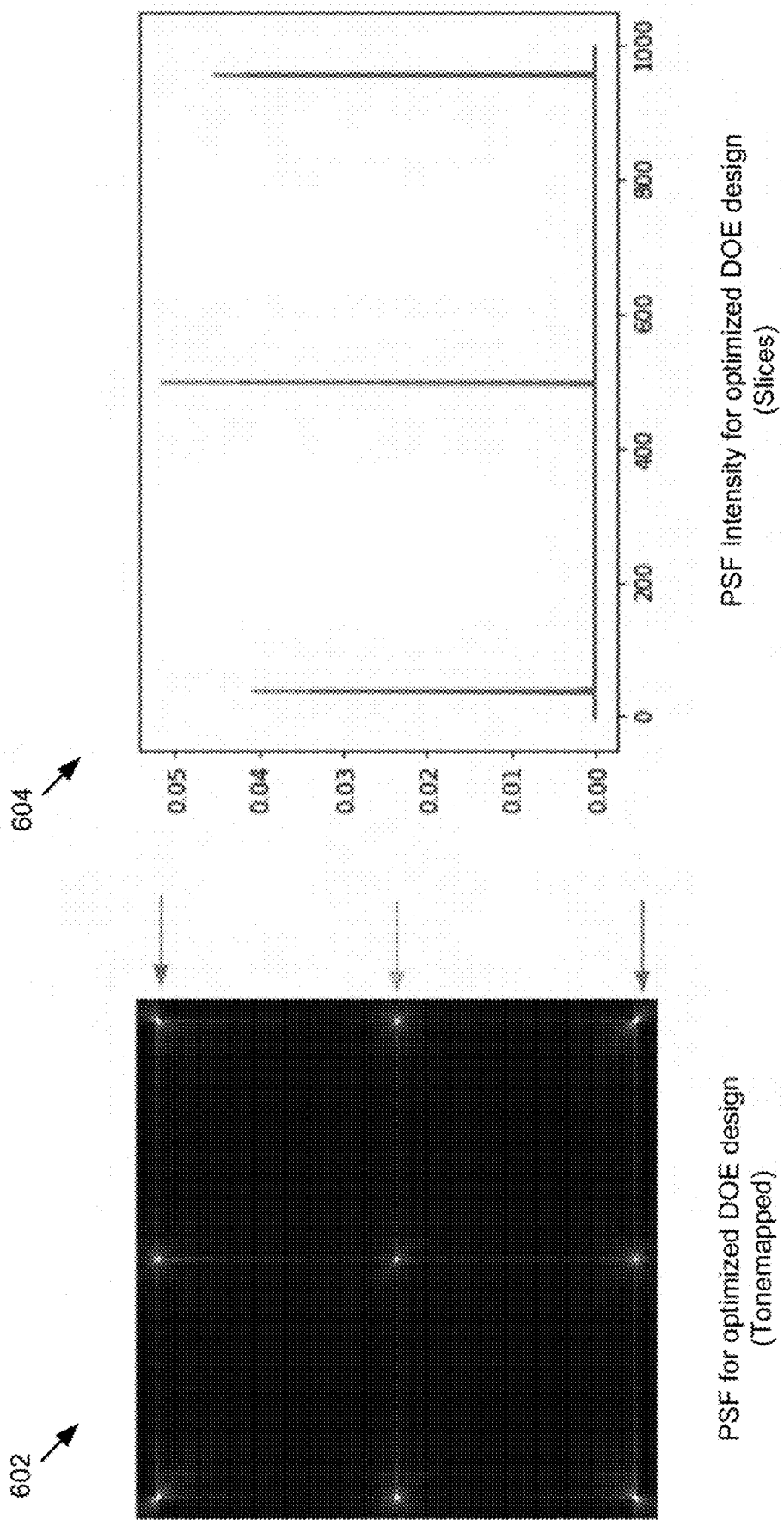
FIG. 6 illustrates an example PSF and PSF intensities for an optimized optical design when an achromatic light source is used.

FIG. 6 illustrates an example tonemapped PSF 602 for an optimized DOE design solving the problem of uneven brightness and example key slices 604 of the PSF or PSF intensity for the optimized DOE design when an achromatic light source is used. As depicted, the locations of the slices are marked in the left image 602.

While the first problem of uneven brightness is solved using the approach discussed above, it is, however, challenging to completely solve the second problem of chromatic aberration (e.g., DOE's PSF changing with different colors) with a DOE 202 alone. One way to solve this problem is by using a refractive lens 204 after the DOE 202 as illustrated in FIG. 2. In particular embodiments, using the refractive lens 204 after the DOE 202 may be used to reduce the chromatic aberration, but not completely eliminate it. Eventually, this problem of chromatic aberration is tackled through an image reconstruction algorithm later discussed in this disclosure with respect to at least FIG. 9. Before discussing the image reconstruction algorithm, different optical design setups that may be used with the duo-camera AR device are discussed below.

Different Optical Design Setups for Duo-Camera Artificial Reality Device

In particular embodiments, three optical design setups may be considered for the duo-camera AR device/system discussed herein. The first optical design setup may include using DOE 202 only. This replaces the entire camera lens stack with a single DOE, requiring all functionality to be included in the DOE. The second optical design setup may include combining the DOE 202 with a refractive lens 204, as illustrated, for example, in FIG. 2. This setup equals inserting an additional DOE into the already existing camera lens stack, potentially while modifying the lens stack. The third optical design setup assumes that the PSF is a perfect beam splitter with no chromatic aberration. It should be noted that the third optical design setup is a hypothetical setup and is used here merely for comparison purposes. For example, the third optical setup with perfect PSF and no chromatic aberration may be used as ground truth to compare results obtained from the first optical design setup and the second optical design setup and determine which optical design setup provides the best results.

In some embodiments, the second optical design setup (i.e., DOE 202 with refractive lens 204) may be chosen as the default design because the focusing lens (e.g., refractive lens 204) minimizes the chromatic aberration. The first optical design setup (i.e., DOE 202 only option), however, has the advantage of being most compact as it omits the compound lens optics stack and therefore, an ultra-thin lens design may be achieved. The downside with the first optical design setup is that a deep network used to reconstruct an image (e.g., as discussed with respect to FIG. 9) needs to compensate for the reducing focusing power and visible chromatic aberration.

Figure 7:
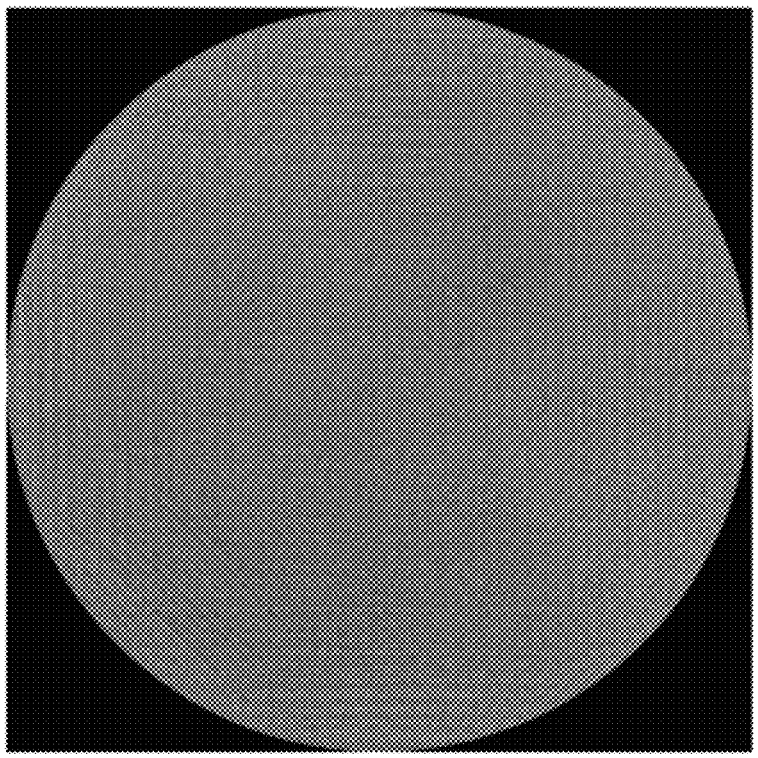
FIG. 7 illustrates example height maps of two different optical design setups that may be used for duo-camera artificial reality device.
Figure 7:
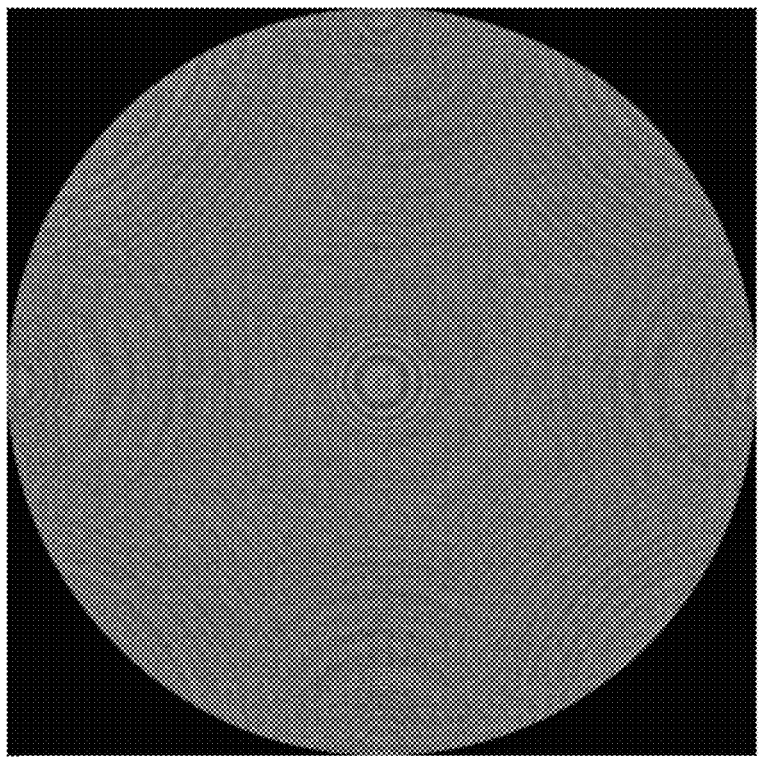
Figure 8:
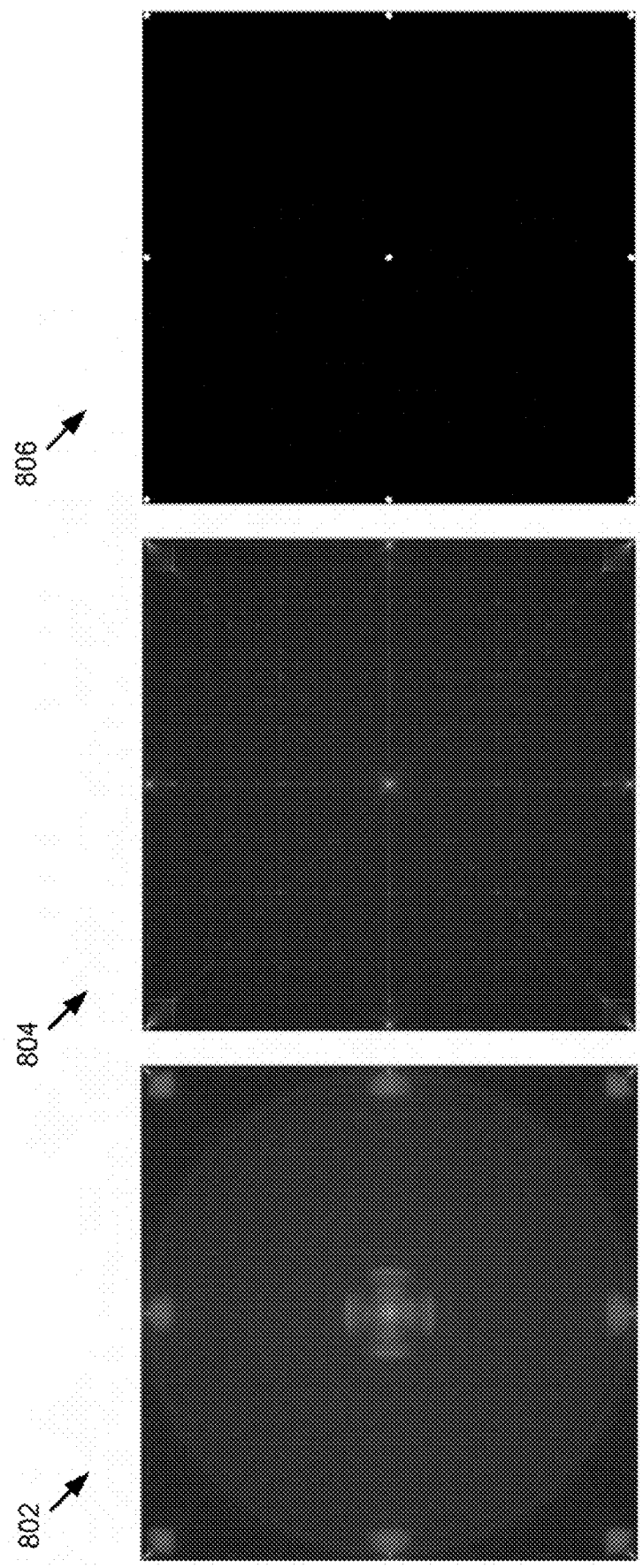
FIG. 8 illustrates example PSFs corresponding to three different optical design setups.

The DOEs for the first and second optical design setups discussed herein may be optimized separately. In the first scenario or first optical design setup (i.e., DOE 202 only option), it may be assumed that the sensor's pixel is 2 μm and that the sensor 206 has a resolution of 512×512, resulting in an active region of approximately 1 mm^2. 3× super resolution may be performed and an output resolution of 1536×1536 may be achieved. In the second scenario or second optical design setup (i.e., DOE 202 with a refractive lens 204), it may be assumed that the lens 204 focuses perfectly and is 2.1 mm in diameter to fully cover the PSF region. In addition, it may be assumed that the lens 204 has 2100×2100 resolution with 1 μm pixel pitch and has the F number of 2.5. FIG. 7 illustrates example height maps of the two optical design setups based on the optimizations for the two setups discussed herein. Here, image 702 depicts the height map of the first optical design setup (i.e., DOE 202 only option) and image 704 depicts the height map of the second optical design setup (i.e., DOE 202 with refractive lens 204). FIG. 8 illustrates log PSF (shown in log scale) of the three optical design setups discussed herein. Specifically, image 802 depicts example PSF for the first optical design setup (i.e., DOE 202 only option), where per-channel peak intensity approximately ranges between/within 0.063 and 0.105. Image 804 depicts example PSF for the second optical design setup (i.e., DOE 202 with refractive lens 204), where the per-channel peak intensity approximately ranges between/within 0.079 and 0.105 and image 806 depicts example PSF for the third optical design setup (i.e., hypothetical setup with perfect PSF and no chromatic aberration), where the per-channel peak intensity is approximately equal to 0.11.

ML-Based Image Reconstruction Process

In particular embodiments, a reconstruction algorithm and/or technique is used to generate a super resolution output image based on a pair of a guide image and an overlapped detail image. The guide image may be a low-resolution wide FoV image of a scene captured by a guide camera, such as guide camera 130. The overlapped detail image (e.g., overlaid detail image 310 or 420) may be obtained based on a single detail image (e.g., captured using a single detail camera 140) and using the beam splitting approach discussed above in reference to at least FIGS. 2, 3, and 4A-4D. The overlapped detail image may comprise high-resolution and/or high-frequency scene information based on an overlay of multiple copies (e.g., 9 copies) of the scene overlaid into a single detailed image. The reconstruction algorithm, in particular embodiments, may use a convolutional neural network, such as, for example, u-shaped encoder-decoder network architecture (UNet). The UNet 916 takes in the pair of guide image 902 and overlapped detail image 904 and outputs a super resolution image, such as output image 920. In particular embodiments, the output image by the reconstruction algorithm may correspond to an upsampled guide image (e.g., upsampled guide image 910) but with high-frequency information. Stated differently, the output image will have same wide FoV as the guide image, but it will be a high or super resolution image having high-frequency information as opposed to low-frequency information in the guide image. The high-resolution details (or high-frequency information) in the output image will be achieved using the overlapped detail image, as discussed in further detail below in reference to FIG. 9.

Figure 9:
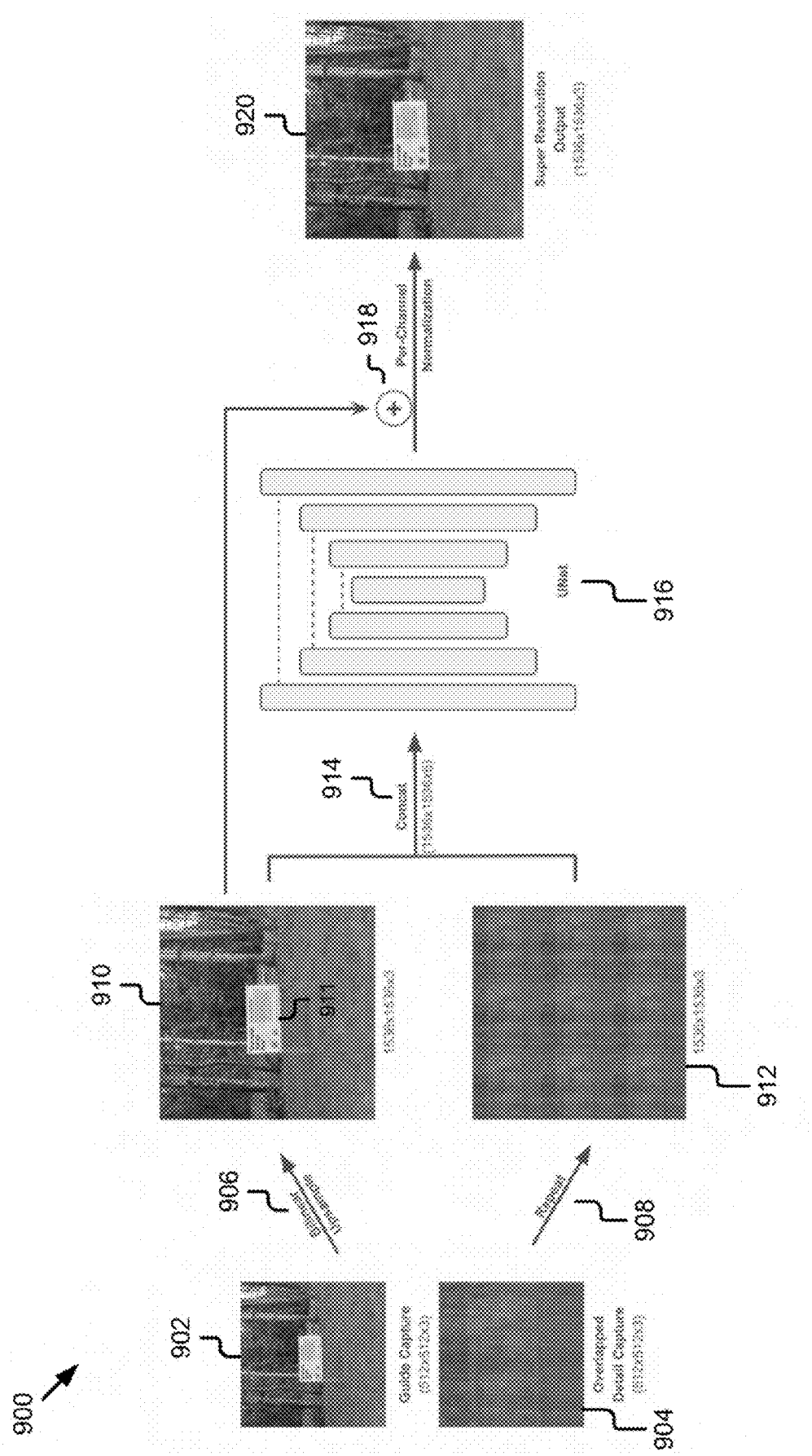
FIG. 9 illustrates an example image reconstruction process used by a reconstruction algorithm to generate a super resolution image.

FIG. 9 illustrates an example ML-based image reconstruction process 900 used by the reconstruction algorithm to generate a super resolution image. As depicted, the reconstruction algorithm takes as input a guide image 902 and an overlapped detail image 904. The guide image 902 may be a low angular resolution wide FoV image captured by the guide camera 130. In the example illustrated in FIG. 9, the guide image 902 is a 3-channel (e.g., RGB channel)

image of 512×512 resolution. The overlapped detail image 904 may include overlapping scene information created by the optical elements (e.g., DOE 202, optional refractive lens 204, and sensor 206) of the duo-camera AR device. As discussed elsewhere herein, a single detail image of a scene may be captured by a single detail camera 140 of the duo-camera AR device. The detail image of the scene is a high angular resolution narrower FoV image. Due to the optical elements of the duo-camera AR device, the scene is copied into multiple copies and shifted relative to the image sensor array. From the multiple shifted copies (e.g., 9 copies) of the scene, an overlapping portion is cropped and then captured by the image sensor 206. This overlapping portion may include multiple overlapping scene information (e.g., scene information from the multiple shifted copies stacked on top of each other). In particular embodiments, the overlapping portion may be cropped according to the size of the guide image. For example, for the 512×512 guide image, a corresponding 512×512 overlapped detail image is taken. This results in a 3-channel (e.g., RGB channel) overlapped detail image 904 of 512×512 resolution, as shown in the example of FIG. 9.

In the initial stage of the process 900, it may be assumed that the guide camera associated with the guide image 902 and the detail camera associated with the overlapped detail image 904 may be approximately co-located and pointing at the same angle. Thus, the full detail image (e.g., without cropping and overlapping) should have perfect registration with the guide image 902. After cropping and overlapping in the data formation process (e.g., as discussed in reference to at least FIGS. 3 and 4A-4D), the detail image is divided into multiple copies or patches (e.g., 9 patches) and the multiple patches are shifted and overlapped in a single patch sized region, which is the overlapped detail image 904 discussed herein.

In particular embodiments, once the guide image 902 and the overlapped detail image 904 are obtained as discussed above, the guide image 902 may be upsampled by a certain amount (e.g., 3×) and the overlapped detail image 904 may be tiled or repeated certain times (e.g., 3×3 fashion), as indicated by reference numerals 906 and 908, respectively. For example, the original guide image 902 of 512×512 resolution is upsampled by 3× resulting in a upsampled guide image 910 of 1536×1536 resolution. A particular upsampling technique (e.g., bilinear upsampling) 906 may be applied to generate the upsampled guide image 910. By way of an example and not limitation, upsampling 906 may be performed by bicubic and/or bilinear interpolation methods. In particular embodiments, the amount by which original guide image 902 is upsampled is based on a resolution of target output image 920 that one is trying to achieve. For example, in order to generate the 1536×1536 output image 920, the 512×512 resolution of the original guide image 902 needs to be upsampled by 3 times to get the 1536×1536 resolution. As another example, in order to generate a 1024×1024 output image 920, the original guide image 902 will be upsampled by 2× to get that resolution.

The upsampled guide image 910 may not contain high-frequency details and/or information. Stated differently, due to the upsampling, high-frequency information may be lost in the upsampled guide image 910. By way of an example and not limitation, the text in board 911 depicted in the upsampled image 910 may not be clearly readable and is unclear. In particular embodiments, the high-frequency details (or scene information) are provided through the overlapped detail image 904. For the overlapped detail image 904 to be able to be used for obtaining this high-resolution scene information at various locations for the upsampled guide image 910, the overlapped detail image 904 first needs to be aligned with the upsampled guide image 910. This aligning may be done by making the resolution of the overlapped detail image 904 same as the upsampled guide image 910. For example, the overlapped detail image 904 also needs to be at the same resolution of 1536×1536 as the upsampled guide image 910. The overlapped detail image 904, however, will not be enlarged in the same way as the original guide image 902. Instead of upsampling, a tiling or a repeating process 908 is performed on the overlapped detail image 904. The tiling process 908 basically repeats the same overlapped detail image 904 a certain number of times in both dimensions to generate a tiled image 912 comprising of repeated overlapped detail images. The tiled image 912 has the same resolution as that of the upsampled guide image 910. As an example, to achieve the resolution of 1536×1536 (which is 3 times the resolution of the overlapped detail image 904), a 3×3 tiling is performed that results in 9 copies of the overlapped detail image 904 placed next to each other in X and Y dimensions, as shown by the tiled image 912. As another example, to achieve the resolution of 1024×1024 (which is 2 times the resolution of the detail overlay image 904), a 2×2 tiling may be performed that results in 4 copies of the overlapped detail image 904 placed next to each other in X and Y dimensions. One benefit of the tiling process 908 is that the high-frequency and/or high-resolution scene information embedded within the overlapped detail image is copied to be closer to each region/location of the upsampled guide image 910. This helps the ML model, such as UNet 916, to find high quality scene information from the overlapped detail image at those regions.

Responsive to obtaining the upsampled guide image 910 and the tiled image 912 comprising of repeated overlapped detail images, they may be concatenated 914. For example, the reconstruction algorithm may concatenate the result into a 6-channel tensor. The concatenated result (e.g., 6-channel tensor) obtained from this concatenation 914 is then fed into a machine learning model, such as UNet 916, to disentangle the information and generate an initial output image. For any feature of the guide image at a specific location/region/patch, the UNet 916 may need to, for example, (1) search for the corresponding high-frequency information in the overlapped detail image, (2) discard the irrelevant information from other patches (e.g., 8 other patches) due to the overlap, and (3) merge with the guide image. The tiling process 908 simplifies the problem by removing the need to do the first step i.e., search for correspondence. Because of the perfect registration assumption, the tiling process 908 shifts all the information back to its original region. Thus, once the repeated overlapped detail images 912 are aligned with the upsampled guide imaged 910, it can be made sure that for any feature in the upsampled guide image 910, the raw information relevant to it may all be found in its vicinity in one of the repeated overlapped detail images 912.

In particular embodiments, in order to preserve the original color of the scene as captured by the guide image 902, the reconstruction algorithm adds 918 a per-channel normalization to the initial output of the UNet 916. The per-channel normalization uses the guide image's color as guidance or reference, and the reconstruction algorithm accordingly scales the output image's RGB channels to generate a super resolution output image 920. In particular embodiments, the final output image 920 may correspond to the upsampled guide image 910 but in high resolution and with high-frequency information that was missing in the guide image. Stated differently, the output image 920 will have the same wide FoV as the guide image, but it will have high-frequency details as opposed to low-frequency details in the guide image. The high-frequency details are achieved using the overlapped detail image and the reconstruction network (e.g., UNet 916) discussed herein. Different training loss functions and data that are used for training the ML model (e.g., UNet 916) are now discussed in the following subsections.

Training Losses

In particular embodiments, a set of training losses may be used to train the ML model (e.g., UNet 916) discussed herein. For example, the training losses may be computed and then the ML model may be updated based on one or more of these training losses. The ML model may be deemed sufficiently trained when one or more of these training losses are minimized. These training losses, may include, for example, an L1 loss, a visual geometry group (VGG)-based perceptual loss, an edge loss, and a correctness loss.

L1 loss is the pixel-wise absolute difference between an output image by the reconstruction algorithm (e.g., output image 920) and a target ground truth image. More specifically, L1 loss includes comparing pixels of the output image with pixels of the ground truth image and then determining absolute differences between the compared pixels.

VGG-based perceptual loss helps encourage natural and perceptually pleasing output. In other words, VGG-based perceptual loss ensures that the output image by the reconstruction algorithm looks natural essentially. In some embodiments, VGG-based perceptual loss may include using a pre-trained VGG network comprising intermediate layers to compare differences between intermediate results associated with the output image and intermediate results associated with the ground truth image.

The edge loss may include applying a high-pass filter to both the output image and the ground truth image to extract high-frequency texture details (e.g., image gradients/edges) associated with both images and then comparing the high-frequency texture details of the output image by the ML model with the high-frequency texture details of the ground truth image. In particular embodiments, the edge loss is helpful for recovering high-frequency textural details. Specifically, when generating the super resolution output image 920 using the reconstruction algorithm discussed herein, the challenge is to get the edges right as the edges are mixed in the overlapped detail image and the edge loss forces the ML model (e.g., UNet 916) to reconstruct the edges correctly.

Correctness loss helps to ensure that there is consistency between the high-resolution output image and the input low-resolution guide image (e.g., guide image 902). This is done by first downsampling the output image to the resolution of the original input guide image. For example, the 1536×1536 resolution of the output image 920 is downsampled to 512×512 resolution of the input guide image 902. Once downsampled, the correctness loss includes calculating the L1 loss (e.g., pixel-wise absolute difference) between the downsampled output image and the original input guide image.

Training Data and Process

In one example embodiment, to train the ML model (e.g, UNet 916) discussed herein, a dataset of a plurality of images of a common real-world scene with a specific resolution is captured. For example, a dataset of 79 photos is captured for common real-world scenes with the resolution 5448×3616. From the dataset, a first set of images may be kept for the training while a second set of images may be kept for testing the ML model. For example, from the 79 photos discussed in the above example, 70 images may be used for the training and 9 images may be used for validation and testing. Because the images are over-sized, they may be downsampled to a certain resolution (e.g., 3013×2000 resolution) to simplify computation, and then the downsampled images are cropped to a desired resolution (e.g., 1536×1536) to create multiple images from a single image. These image samples are treated as ground truth images. Given a ground truth image (1536×1536×3), first it is downsampled to synthesize the guide image (512×512×3). For the overlapped detail image, the ground truth image is convoluted with the PSF simulated from a particular lens design, the convolved image is cropped into certain grid of crops (e.g., 3×3 crops), each crop has the size of the guide image (512×512×3), and finally all the crops (e.g., 9 crops) are averaged to synthesize the final overlapped detail image.

Figure 10:
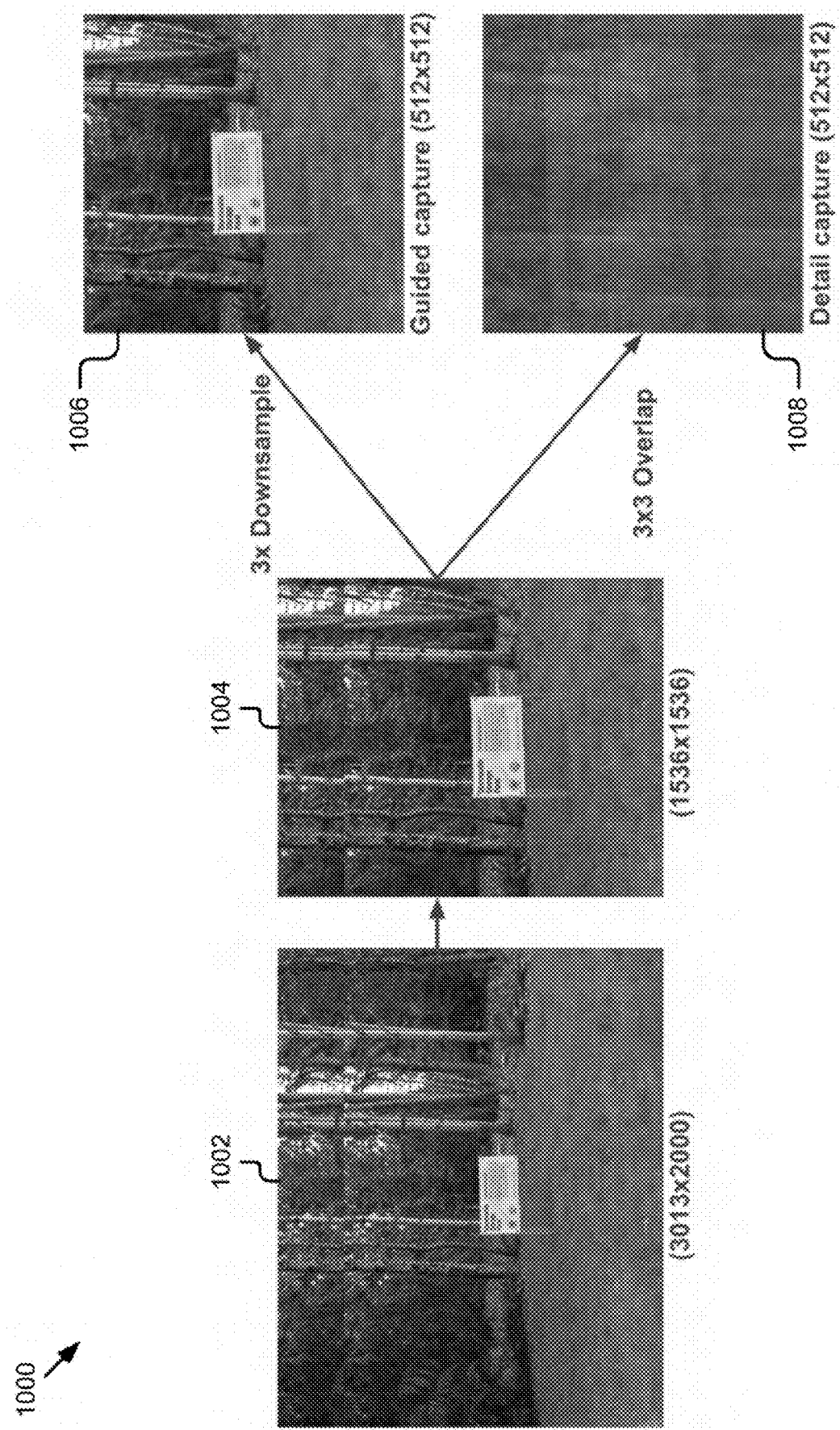
FIG. 10 illustrates an example data generation process for generating example input training images for training a machine learning model for generating super resolution images.

FIG. 10 illustrates an example data generation process 1000 for generating example input training images for training the ML model discussed herein. A high or super-resolution image 1002 of a scene is taken with the resolution 3013×2000. The image 1002 is cropped into image 1004 of 1536×1536 resolution. This image 1004 may be used as ground truth for comparing an output image generated by the ML model based on one or more of the training losses discussed above. Given the ground truth image 1004, it is downsampled (e.g., 3× downsample) to synthesize the guide image 1006 of 512×512 resolution. To obtain an overlapped detail image 1008, the ground truth image 1004 is convoluted with a PSF simulated from a particular lens design, the convolved image is cropped into certain grid of crops (e.g., 3×3 crops), each crop has the size of the guide image (512×512×3), and finally all the crops (e.g., 9 crops) are averaged to synthesize the final overlapped detail image 1008.

The guide image 1006 and the overlapped detail image 1008 may be used as one exemplary training inputs to the reconstruction algorithm where the reconstruction process 900 is performed to generate an output image using the ML model. The output image generated by the ML model will be compared with a ground truth image (e.g., ground truth image 1004) based on a set of training losses (e.g., L1 loss, VGG-based perceptual loss, edge loss, correctness loss). This process, including (1) the data generation process 1000 to generate a pair of guide and overlapped detail images to be used as inputs to the reconstruction algorithm, (2) the reconstruction process 900 to generate an output image based on the pair of guide and overlapped detail images using the ML model, (3) computing the training losses based on results of the output image and ground truth image, and (4) updating the ML model based on the computed training losses, is repeated until the ML model is deemed sufficiently trained. In one embodiment, the ML model is deemed sufficiently trained when one or more of the training losses are minimized.

After the ML model has been trained, it could be stored on the duo-camera AR device for locally generating a super resolution image. For example, the trained ML model may be stored in a memory (e.g., memory 1504) of the duo-camera artificial reality device. The duo-camera artificial reality device, as discussed elsewhere herein, comprises a guide camera and a single detail camera. Also, the duo-camera artificial reality device will have a particular optical design setup (e.g., having only DOE 202 or DOE 202 with a refractive lens 204). The guide camera of the duo-camera artificial reality device may be captured to capture a guide image. The detail camera, in combination with the particular optical design setup, may be configured to capture an overlapped detail image. In particular embodiments, the guide image may be upsampled and the overlapped detail image may be repeated certain number of times and then their concatenated result is provided as input to the trained ML model, which would in turn generate an initial output image. The initial output image may then undergo per-channel normalization using the color of the guide image. The final result after the per-channel normalization would be a super resolution output image (e.g., output image 920) that may be used for a variety of downstream applications. As an example, one of the downstream applications for which the super resolution output image may be used may include photography, such as high-resolution photography, low light photography, high dynamic range photography, and/or general-purpose consumer photography. As another example, downstream applications may include videography and/or low light videography, SLAM/VIO, object tracking, reading and/or processing text and/or bar codes, such as QR codes.

Example Results and Comparisons

Figure 11:
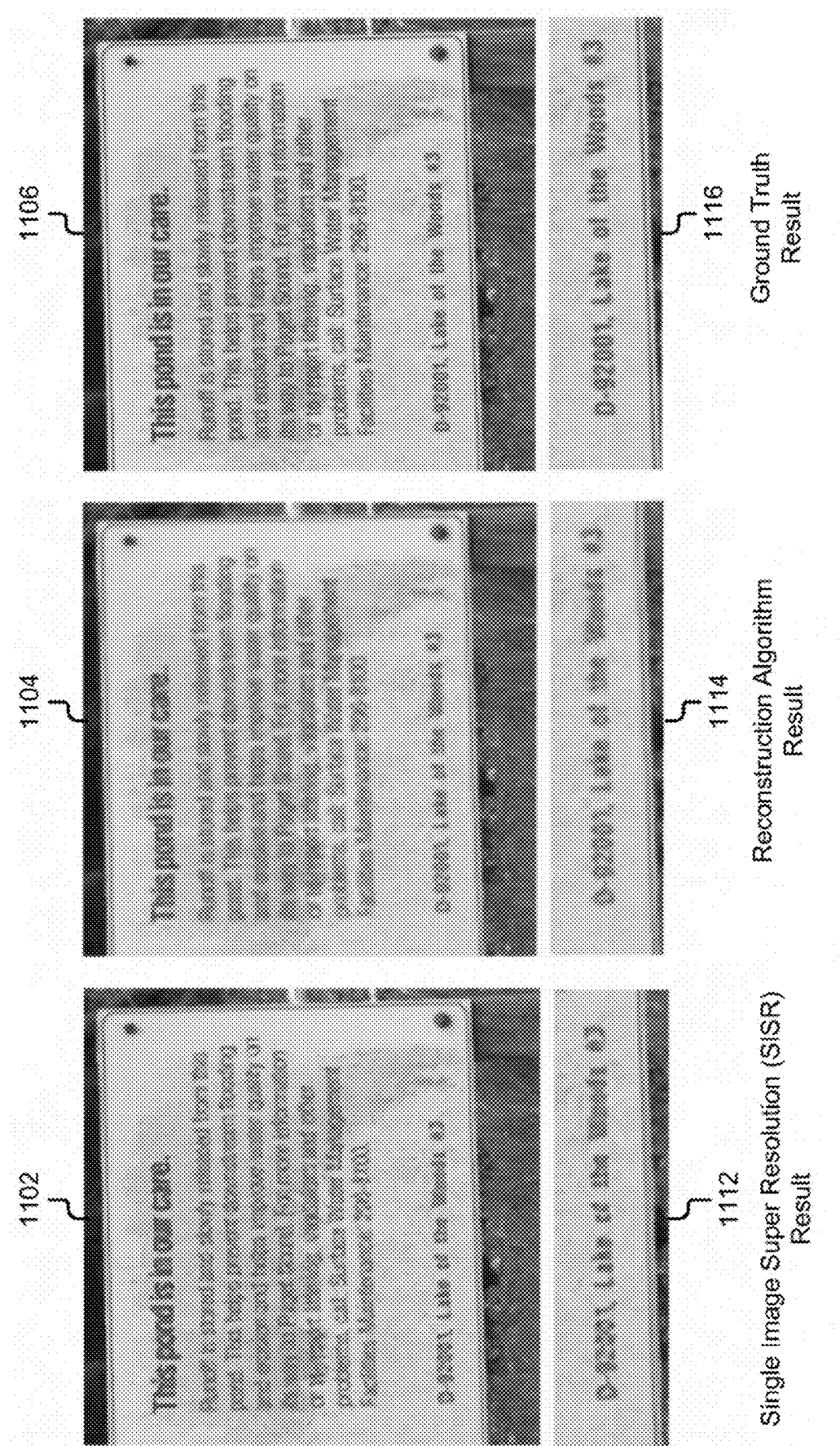
FIG. 11 illustrates an example comparison between a result produced by a Single-image super resolution (SISR) method, a result produced by the reconstruction algorithm discussed herein, and a ground truth result.

To test the performance of the reconstruction algorithm discussed herein, results of the reconstruction algorithm are compared with the results of the SISR methods. To generate a super-resolution image using the reconstruction algorithm, given a high-resolution ground truth image, it is first downsampled to create a guide image. And then, assuming perfect PSF, an overlapped detail image is created. Both images will be provided to the reconstruction algorithm to estimate a super-resolution image. In comparison, SISR takes only the guide image and produces a super-resolution image. FIG. 11 illustrates an example comparison between a result 1102 produced by a SISR method, a result 1104 produced by the reconstruction algorithm, and a ground truth result 1106. As depicted, both results 1102 and 1104 look blurrier compared to the ground truth result 1106. However, the result 1104 produced by the reconstruction algorithm still provides easier-to-read text compared to the result 1102 produced by the SISR. This can be seen more clearly in the corresponding zoomed-in cropped portions 1112, 1114, and 1116 of the results 1102, 1104, and 1106, respectively. In particular embodiments, the result 1104 (or 1114) of the reconstruction algorithm being clearer than the result 1102 (or 1112) of the SISR is due to the fact the reconstruction algorithm uses high-frequency information from the overlapped detail image.

Figure 12:
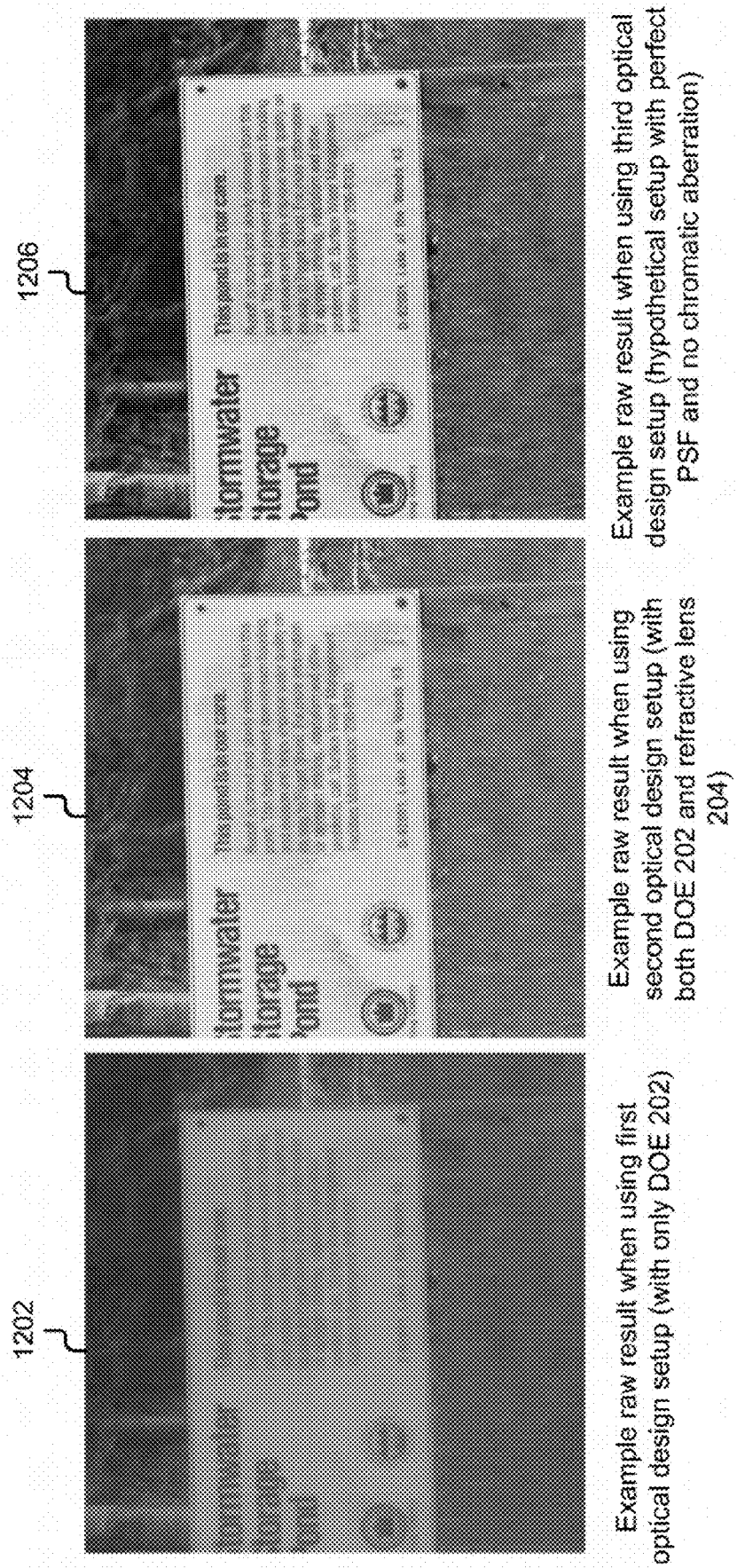
FIG. 12 illustrates an example comparison between raw results produced by using different optical design setups for duo-camera artificial reality device.

Next, the three optical design setups discussed earlier in this disclosure are compared. To reiterate, a first optical design setup includes using DOE 202 only, a second optical design setup includes combining the DOE 202 with a refractive lens 204, and a third optical design setup is a hypothetical setup with perfect PSF and no chromatic aberration. FIG. 12 illustrates an example comparison between results produced by these different optical design setups. Specifically, FIG. 12 illustrates a result 1202 produced by the first optical design setup that uses only DOE 202, a result 1204 produced by the second optical design setup that combines both the DOE 202 and the refractive lens 204, and a result 1206 produced by the third hypothetical optical design setup with perfect PSF and no chromatic aberration. As can be seen, both first and second optical design setups contain some chromatic aberrations. The first optical design setup (e.g., DOE 202 only) has more obvious aberrations.

Figure 13:
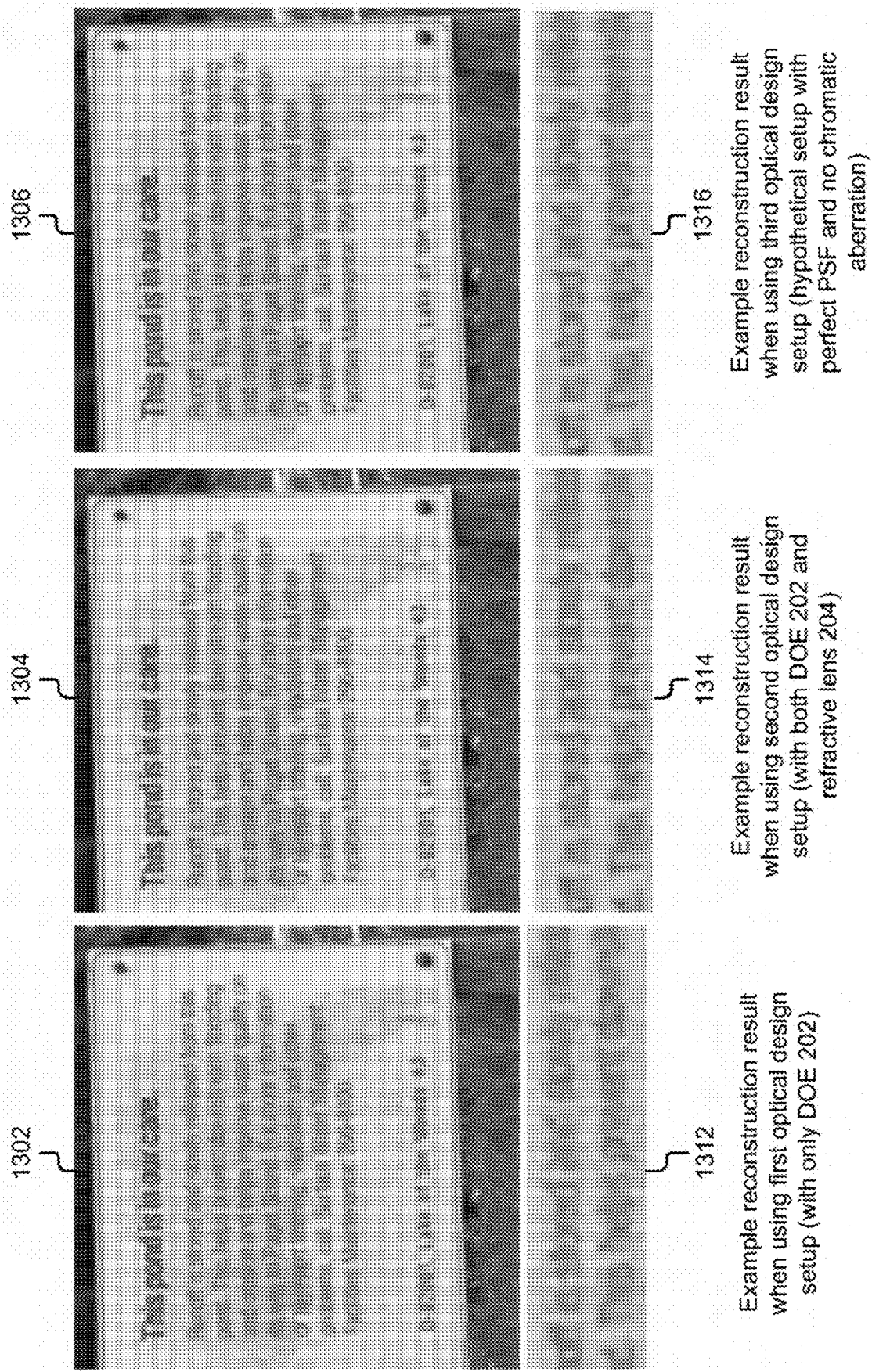
FIG. 13 illustrates an example comparison between reconstruction results produced by the reconstruction algorithm for the different optical design setups.

FIG. 13 illustrates an example comparison between reconstruction results produced by the reconstruction algorithm discussed herein for the different optical design setups. Specifically, the reconstruction algorithm produces a result 1302 when using the first optical design setup (e.g., DOE 202 only). The reconstruction algorithm produces a result 1304 when using the second optical design setup (e.g., DOE 202 with refractive lens 204). The reconstruction algorithm produces a result 1306 when using the third optical design setup (e.g., hypothetical setup with perfect PSF and no chromatic aberration). To be able to better assess the differences between the results 1302, 1304, and 1306, their corresponding zoomed-in cropped portions 1312, 1314, and 1316 are respectively provided. Despite the strong chromatic aberrations, the reconstruction results show that that the ML model (e.g., UNet 916) can correct the color problem, which was originally the case, for example, in result 1202. Also, it can be observed that when reconstructing an image using the reconstruction algorithm discussed herein, the quality of results produced with either the first optical design setup (e.g., with DOE 202 only) or the second optical design setup (e.g., with both DOE 202 and refractive lens 204) is somewhat similar. As such, either of the first optical design setup or the second optical design setup may be used for the duo-camera artificial reality device.

Example Method

Figure 14:
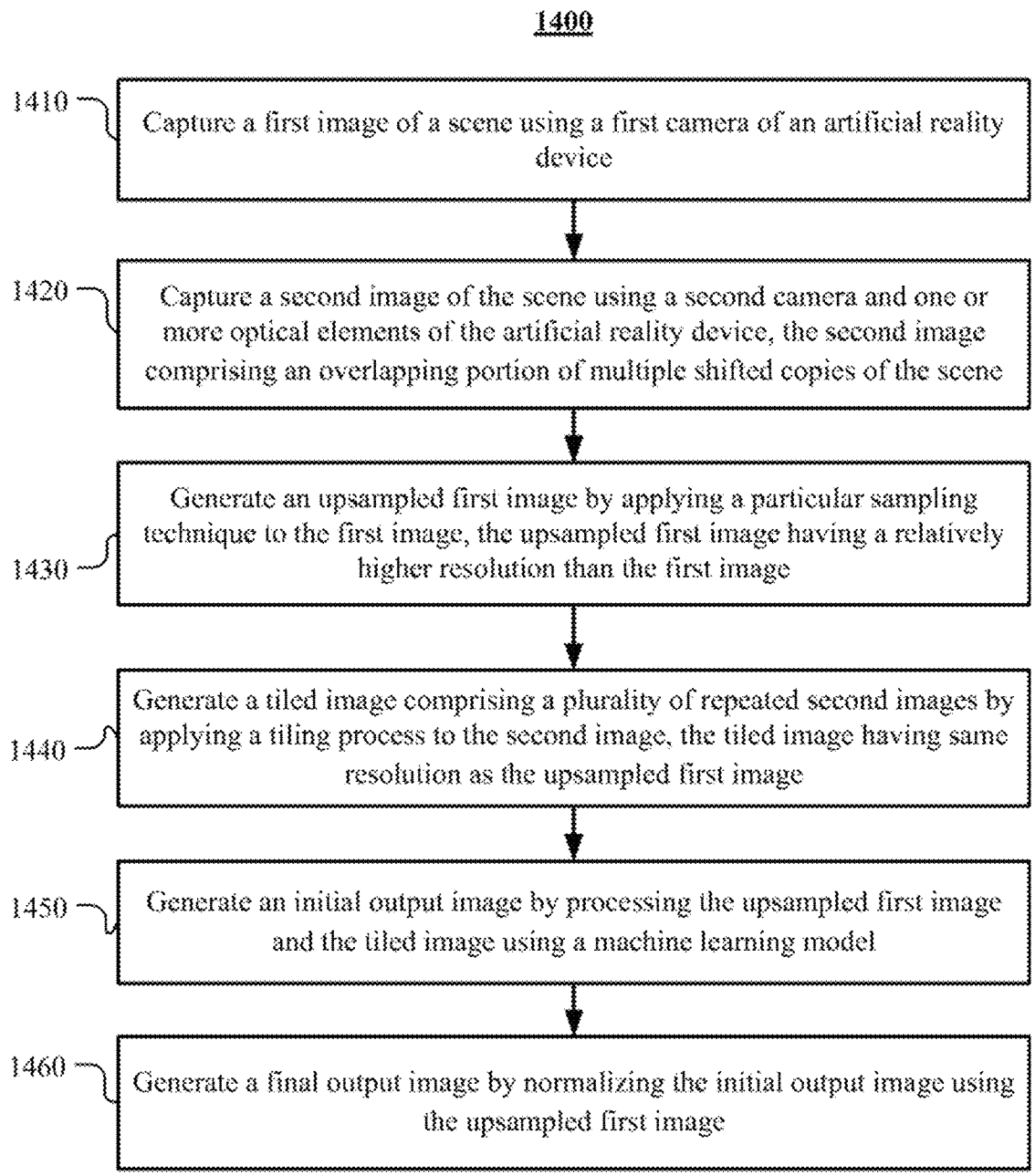
FIG. 14 illustrates an example method for generating a super resolution image via the duo-camera artificial reality device, in accordance with particular embodiments.

FIG. 14 illustrates an example method 1400 for generating a high or super resolution image via the duo-camera artificial reality device, in accordance with particular embodiments. The method 1400 may begin at step 1410, where a computing system (e.g., the computer system 1500) associated with the duo-camera artificial reality device may capture a first image (e.g., guide image 902) of a scene using a first camera of the duo-camera artificial reality device. The first camera may be a low angular resolution guide camera 130 with a wide field of view. In particular embodiments, the duo-camera artificial reality device is a wearable augmented reality (AR) glass or frame.

At step 1420, the computing system may capture a second image (e.g., overlapped detail image 904) of the scene using a second camera and one or more optical elements of the artificial reality device. In particular embodiments, the second camera may be a high angular resolution detail camera 140 with a narrower field of view than the first camera. In some embodiments, the one or more optical elements may include a diffractive optical element, such as DOE 202. The DOE 202 may be configured to function as a beam splitter to split incoming light beam representing the scene from the second camera into multiple light beams corresponding to the multiple shifted copies of the scene. In some embodiments, the one or more optical elements may include the DOE 202 as well as a refractive lens 204, which is configured to reduce effects of chromatic aberration, as discussed elsewhere herein.

In particular embodiments, the one or more optical elements may include a DOE 202, a refractive lens 204, and a sensor 206, and capturing the second image may include, for example, (1) receiving an incoming light representing the scene from the second camera (e.g., detail camera 140), (2) splitting, using the DOE 202, the incoming light into multiple light beams corresponding to multiple shifted copies of the scene, (3) focusing, using the refractive lens 204, the multiple light beams onto different regions of the sensor 206, and (4) capturing, using the sensor 206, the overlapping portion of the multiple shifted copies of the scene based on the multiple light beams focused onto the different regions of the sensor 206. The overlapping portion is the second image. In particular embodiments, each of the multiple shifted copies of the scene may represent scene information from a relatively different perspective, and the multiple shifted copies of the scene may be stacked on top of each other in the overlapping portion.

At step 1430, the computing system may generate an upsampled first image (e.g., upsampled guide image 910) by applying a particular sampling technique to the first image (e.g., guide image 902). The upsampled first image has a relatively higher resolution than the first image. In particular embodiments, the particular sampling technique may include a bilinear or bicubic interpolation method.

At step 1440, the computing system may generate a tiled image (e.g., tiled image 912) comprising a plurality of repeated second images by applying a tiling process to the second image (e.g., overlapped detail image 904). In particular embodiments, the tiled image has same resolution as the upsampled first image, as shown and discussed for example in reference to FIG. 9.

At step 1450, the computing system may generate an initial output image by processing the upsampled first image and the tiled image using a machine learning model. In particular embodiments, the machine learning model is a u-shaped encoder-decoder network architecture, such as UNet 916. In particular embodiments, processing the upsampled first image and the tiled image using the machine learning model may include, for example, (1) for one or more regions of the upsampled first image, retrieving high-frequency image details corresponding to the one or more regions from one or more second images in the tiled image and (2) replacing image details at the one or more regions of the upsampled first image with the high-frequency image details retrieved from the one or more second images in the tiled image.

In particular embodiments, prior to processing the upsampled first image and the tiled image using the machine learning model, the upsampled image and the tiled image may be concatenated into a concatenated result (e.g., 6-channel tensor) and then the initial output image is generated by processing the concatenated result using the machine learning model.

In particular embodiments, the machine learning model discussed herein may be trained using a set of training losses. These training losses may include one or more of (1) an L1 loss that comprises training the machine learning model based on a pixel-wise absolute difference between the final output image and a ground truth image, (2) a visual geometry group (VGG)-based perceptual loss that comprises training the machine learning model based on differences between intermediate results associated with the final output image and the ground truth image using a pre-trained VGG network, (3) an edge loss that comprises training the machine learning model based on applying a high-pass filter to the final output image and the ground truth image to extract high-frequency texture details and comparing the high-frequency texture details of the final output image with the high-frequency texture details of the ground truth image, and (4) a correctness loss that comprises training the machine learning model based on downsampling the final output image to a resolution of the first image and calculating the pixel-wise absolute difference between downsampled output image and the first image.

At step 1460, the computing system may generate a final output image (e.g., output image 920) by normalizing the initial output image using the upsampled first image (e.g., upsampled guide image 910). The final output image may be a high-resolution or super resolution image of the scene that has same wide field of view as the first image (e.g., guide image 904) and includes high-frequency image details based on the second image (e.g., overlapped detail image 906). In particular embodiments, normalizing the initial output image using the upsampled first image to generate the final output image may include white balancing color channels of the initial output image using colors of the upsampled first image.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for generating a super resolution image via the duo-camera artificial reality device, including the particular steps of the method of FIG. 14, this disclosure contemplates any suitable method for generating a super resolution image via the duo-camera artificial reality device, including any suitable steps, which may include a subset of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Example Computer System

Figure 15:
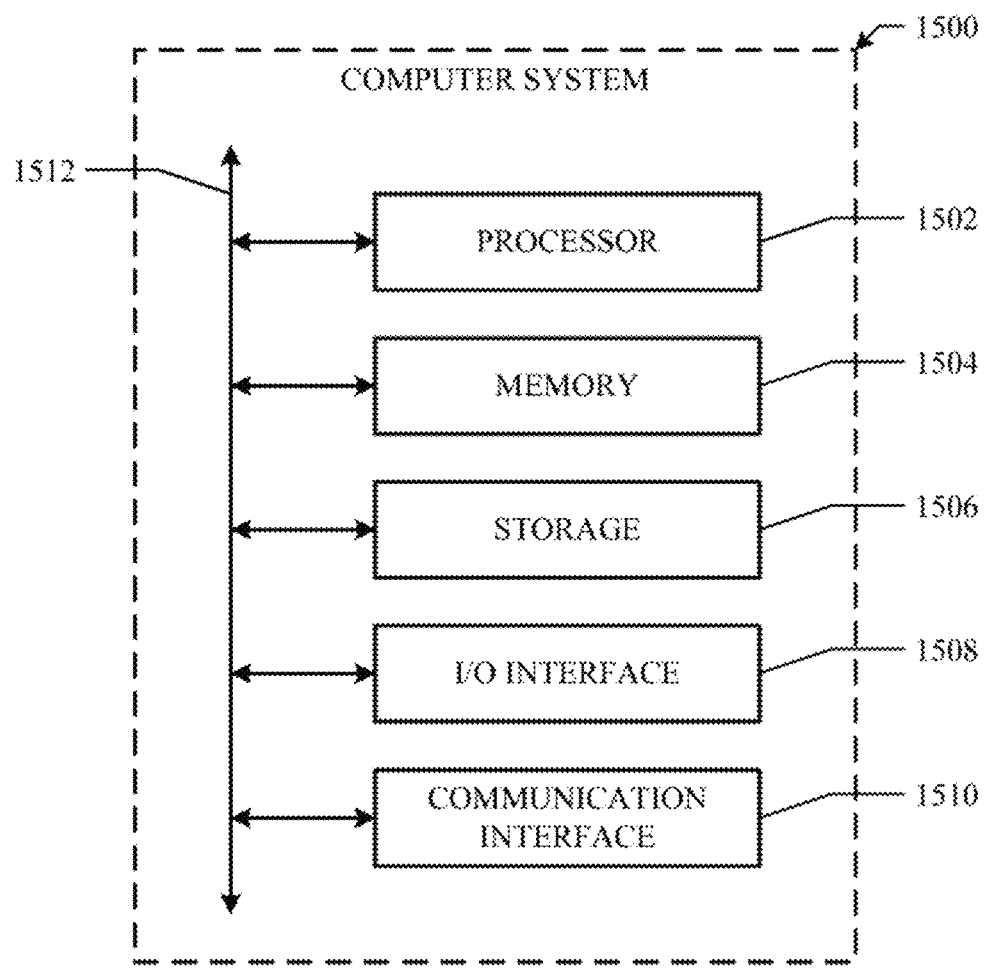
FIG. 15 illustrates an example computer system.

FIG. 15 illustrates an example computer system 1500. In particular embodiments, the duo-camera AR system discussion herein may use the computer system 1500 to perform one or more steps of one or more processes, algorithms, techniques, or methods described or illustrated herein. By way of an example and not limitation, the reconstruction algorithm discussed herein may be executed and/or implemented by one or more components of the computer system 1500. In one embodiment, the computer system 1500 may be part of or included in the duo-camera AR system. In other embodiments, the computer system 1500 may be a separate standalone computing unit to which the duo-camera AR system connects either wirelessly or through a wired connection.

In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor

1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    capturing a first image of a scene using a first camera of an artificial reality device;
    capturing a second image of the scene using a second camera and one or more optical elements of the artificial reality device, wherein the second image comprises an overlapping portion of multiple shifted copies of the scene;
    generating an upsampled first image by applying a particular sampling technique to the first image, wherein the upsampled first image has a relatively higher resolution than the first image;
    generating a tiled image comprising a plurality of repeated second images by applying a tiling process to the second image, wherein the tiled image has same resolution as the upsampled first image;
    generating an initial output image by processing the upsampled first image and the tiled image using a machine learning model; and
    generating a final output image by normalizing the initial output image using the upsampled first image.

2. The method of claim 1, wherein:
    the first camera is a low angular resolution camera with a wide field of view; and
    the second camera is a high angular resolution camera with a narrower field of view than the first camera.

3. The method of claim 1, wherein the machine learning model is trained using a set of training losses, wherein the set of training losses comprises one or more of:
- an L1 loss that comprises training the machine learning model based on a pixel-wise absolute difference between the final output image and a ground truth image;
- a visual geometry group (VGG)-based perceptual loss that comprises training the machine learning model based on differences between intermediate results associated with the final output image and the ground truth image using a pre-trained VGG network;
- an edge loss that comprises training the machine learning model based on applying a high-pass filter to the final output image and the ground truth image to extract high-frequency texture details and comparing the high-frequency texture details of the final output image with the high-frequency texture details of the ground truth image; and
- a correctness loss that comprises training the machine learning model based on downsampling the final output image to a resolution of the first image and calculating the pixel-wise absolute difference between downsampled output image and the first image.

4. The method of claim 1, wherein the one or more optical elements comprise a diffractive optical element, wherein the diffractive optical element is configured to function as a beam splitter to split incoming light beam representing the scene from the second camera into multiple light beams corresponding to the multiple shifted copies of the scene.

5. The method of claim 4, wherein the one or more optical elements comprise the diffractive optical element and a refractive lens, wherein the refractive lens is configured to reduce effects of chromatic aberration.

6. The method of claim 1, wherein the one or more optical elements comprise a diffractive optical element, a refractive lens, and a sensor; and
wherein capturing the second image of the scene comprises:
- receiving an incoming light representing the scene from the second camera;
- splitting, using the diffractive optical element, the incoming light into multiple light beams corresponding to the multiple shifted copies of the scene;
- focusing, using the refractive lens, the multiple light beams onto different regions of the sensor; and
- capturing, using the sensor, the overlapping portion of the multiple shifted copies of the scene based on the multiple light beams focused onto the different regions, wherein the overlapping portion is the second image.

7. The method of claim 1, wherein the final output image is a high-resolution image of the scene that has same field of view as the first image and includes high-frequency image details based on the second image.

8. The method of claim 1, wherein processing the upsampled first image and the tiled image using the machine learning model comprises:
for one or more regions of the upsampled first image, retrieving high-frequency image details corresponding to the one or more regions from one or more second images in the tiled image; and
replacing image details at the one or more regions of the upsampled first image with the high-frequency image details retrieved from the one or more second images in the tiled image.

9. The method of claim 1, wherein normalizing the initial output image using the upsampled first image comprises:
white balancing color channels of the initial output image using colors of the upsampled first image.

10. The method of claim 1, further comprising:
concatenating the upsampled image and the tiled image into a concatenated result;
wherein the initial output image is generated by processing the concatenated result using the machine learning model.

11. The method of claim 1, wherein each of the multiple shifted copies of the scene represent scene information from a relatively different perspective, and wherein the multiple shifted copies of the scene are stacked on top of each other in the overlapping portion.

12. The method of claim 1, wherein the machine learning model is a u-shaped encoder-decoder network architecture (UNet).

13. The method of claim 1, wherein the particular sampling technique comprises a bilinear or bicubic interpolation method.

14. The method of claim 1, wherein the artificial reality device is a wearable augmented reality (AR) glass or frame.

15. One or more computer-readable non-transitory storage media embodying software that is operable when executed to:
- capture a first image of a scene using a first camera of an artificial reality device;
- capture a second image of the scene using a second camera and one or more optical elements of the artificial reality device, wherein the second image comprises an overlapping portion of multiple shifted copies of the scene;
- generate an upsampled first image by applying a particular sampling technique to the first image, wherein the upsampled first image has a relatively higher resolution than the first image;
- generate a tiled image comprising a plurality of repeated second images by applying a tiling process to the second image, wherein the tiled image has same resolution as the upsampled first image;
- generate an initial output image by processing the upsampled first image and the tiled image using a machine learning model; and
- generate a final output image by normalizing the initial output image using the upsampled first image.

16. The media of claim 15, wherein:
the first camera is a low angular resolution camera with a wide field of view; and
the second camera is a high angular resolution camera with a narrower field of view than the first camera.

17. The media of claim 15, wherein the machine learning model is trained using a set of training losses, wherein the set of training losses comprises one or more of:
- an L1 loss that comprises training the machine learning model based on a pixel-wise absolute difference between the final output image and a ground truth image;
- a visual geometry group (VGG)-based perceptual loss that comprises training the machine learning model based on differences between intermediate results associated with the final output image and the ground truth image using a pre-trained VGG network;
- an edge loss that comprises training the machine learning model based on applying a high-pass filter to the final output image and the ground truth image to extract high-frequency texture details and comparing the high-frequency texture details of the final output image with the high-frequency texture details of the ground truth image; and a correctness loss that comprises training the machine learning model based on downsampling the final output image to a resolution of the first image and calculating the pixel-wise absolute difference between downsampled output image and the first image.

18. An artificial reality device comprising:
a first camera and a second camera;
one or more optical elements;
one or more processors; and
one or more computer-readable non-transitory storage media coupled to one or more of the processors and comprising instructions operable when executed by one or more of the processors to cause the artificial reality device to:
capture a first image of a scene using the first camera of the artificial reality device;
capture a second image of the scene using the second camera and the one or more optical elements of the artificial reality device, wherein the second image comprises an overlapping portion of multiple shifted copies of the scene;
generate an upsampled first image by applying a particular sampling technique to the first image, wherein the upsampled first image has a relatively higher resolution than the first image;
generate a tiled image comprising a plurality of repeated second images by applying a tiling process to the second image, wherein the tiled image has same resolution as the upsampled first image;
generate an initial output image by processing the upsampled first image and the tiled image using a machine learning model; and
generate a final output image by normalizing the initial output image using the upsampled first image.

19. The artificial reality device of claim 18, wherein:
the first camera is a low angular resolution camera with a wide field of view; and
the second camera is a high angular resolution camera with a narrower field of view than the first camera.

20. The artificial reality device of claim 18, wherein the machine learning model is trained using a set of training losses, wherein the set of training losses comprises one or more of:
an L1 loss that comprises training the machine learning model based on a pixel-wise absolute difference between the final output image and a ground truth image;
a visual geometry group (VGG)-based perceptual loss that comprises training the machine learning model based on differences between intermediate results associated with the final output image and the ground truth image using a pre-trained VGG network;
an edge loss that comprises training the machine learning model based on applying a high-pass filter to the final output image and the ground truth image to extract high-frequency texture details and comparing the high-frequency texture details of the final output image with the high-frequency texture details of the ground truth image; and
a correctness loss that comprises training the machine learning model based on downsampling the final output image to a resolution of the first image and calculating the pixel-wise absolute difference between downsampled output image and the first image.

* * * * *